United States Patent
Elliott, Jr. et al.

(10) Patent No.: US 10,435,880 B1
(45) Date of Patent: Oct. 8, 2019

(54) MODULAR STORM WATER MANAGEMENT SYSTEMS AND METHODS OF ASSEMBLING THE SAME

(71) Applicant: Jensen Enterprises, Inc., Sparks, NV (US)

(72) Inventors: Thomas P. Elliott, Jr., Reno, NV (US); Tyler R. Haack, Redlands, CA (US); Joseph P. Peterson, Reno, NV (US)

(73) Assignee: Jensen Enterprises, Inc., Sparks, NV (US)

( * ) Notice: Subject to any disclaimer, the term of this patent is extended or adjusted under 35 U.S.C. 154(b) by 0 days.

(21) Appl. No.: 16/027,128

(22) Filed: Jul. 3, 2018

(51) Int. Cl.
| | | |
|---|---|---|
| *E03F 1/00* | (2006.01) |
| *E01F 5/00* | (2006.01) |
| *E02B 11/00* | (2006.01) |
| *E01C 11/22* | (2006.01) |
| *C02F 103/00* | (2006.01) |

(52) U.S. Cl.
CPC ............ *E03F 1/005* (2013.01); *E01C 11/226* (2013.01); *C02F 2103/001* (2013.01); *E01F 5/00* (2013.01); *E02B 11/00* (2013.01)

(58) Field of Classification Search
CPC ........... E03F 1/008; E01C 11/226; E01F 5/00; E02B 11/00
See application file for complete search history.

(56) References Cited

U.S. PATENT DOCUMENTS

| | | | | |
|---|---|---|---|---|
| 4,797,030 A * | 1/1989 | Lockwood | ............... | E01F 5/005 405/124 |
| 4,825,494 A * | 5/1989 | King | ....................... | E01C 3/006 14/73 |
| 4,983,070 A * | 1/1991 | Hwang | ................... | E01F 5/005 405/124 |
| 6,779,946 B1 * | 8/2004 | Urriola | ................... | E01C 9/004 405/43 |
| 7,344,335 B2 * | 3/2008 | Burkhart | ................. | E03F 1/005 405/126 |
| 8,708,601 B2 * | 4/2014 | Elliott | ..................... | E01F 5/005 405/126 |
| 10,145,241 B1 * | 12/2018 | Tessien | ................... | E21F 1/003 |
| 2009/0067928 A1 * | 3/2009 | Currivan | ................. | E03F 1/005 405/43 |
| 2010/0221068 A1 * | 9/2010 | Burkhart, Sr. | .......... | E03F 1/002 405/36 |
| 2015/0151914 A1 * | 6/2015 | Boulton | ................ | B65G 5/005 210/170.03 |
| 2016/0116112 A1 * | 4/2016 | Bradfield | ............... | E02D 29/10 52/578 |
| 2018/0030712 A1 * | 2/2018 | Kent | ....................... | E03F 1/005 |

* cited by examiner

*Primary Examiner* — Benjamin F Fiorello
(74) *Attorney, Agent, or Firm* — Knobbe Martens Olson & Bear LLP

(57) ABSTRACT

A storm water management system and methods of assembling the same are provided. The system has open columns having corbels that support a slab spanning between adjacent columns. The system is assembled by positioning a first plurality of slabs end-to-end and spaced apart from a second plurality of slabs. The column is seated into an opening formed between the first and second plurality of slabs. A first corbel extends from a first side of the column and over laps an edge portion of a slab of the first plurality. A second corbel extends from a second side of the column and over laps an edge portion of a slab of the second plurality.

23 Claims, 31 Drawing Sheets

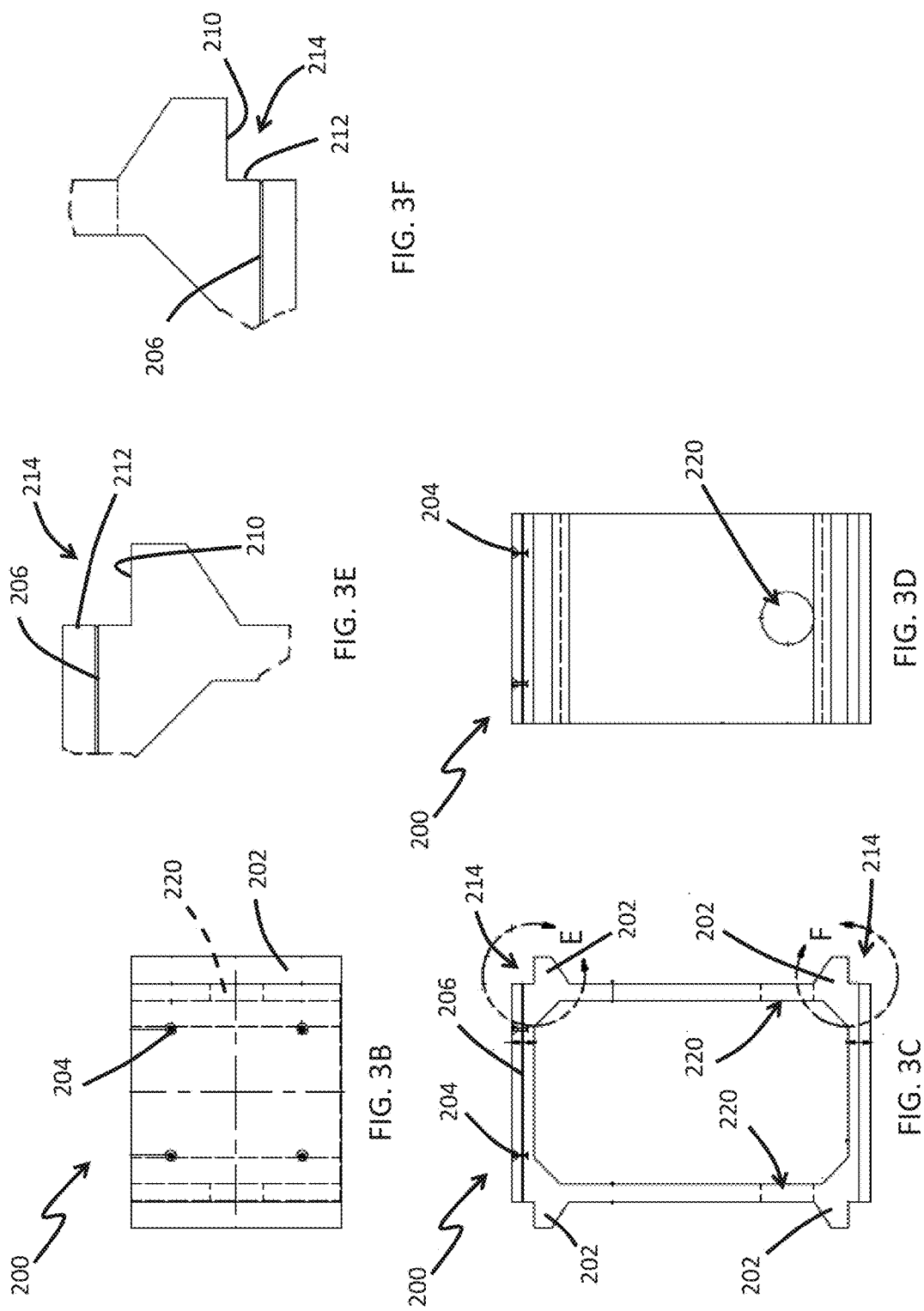

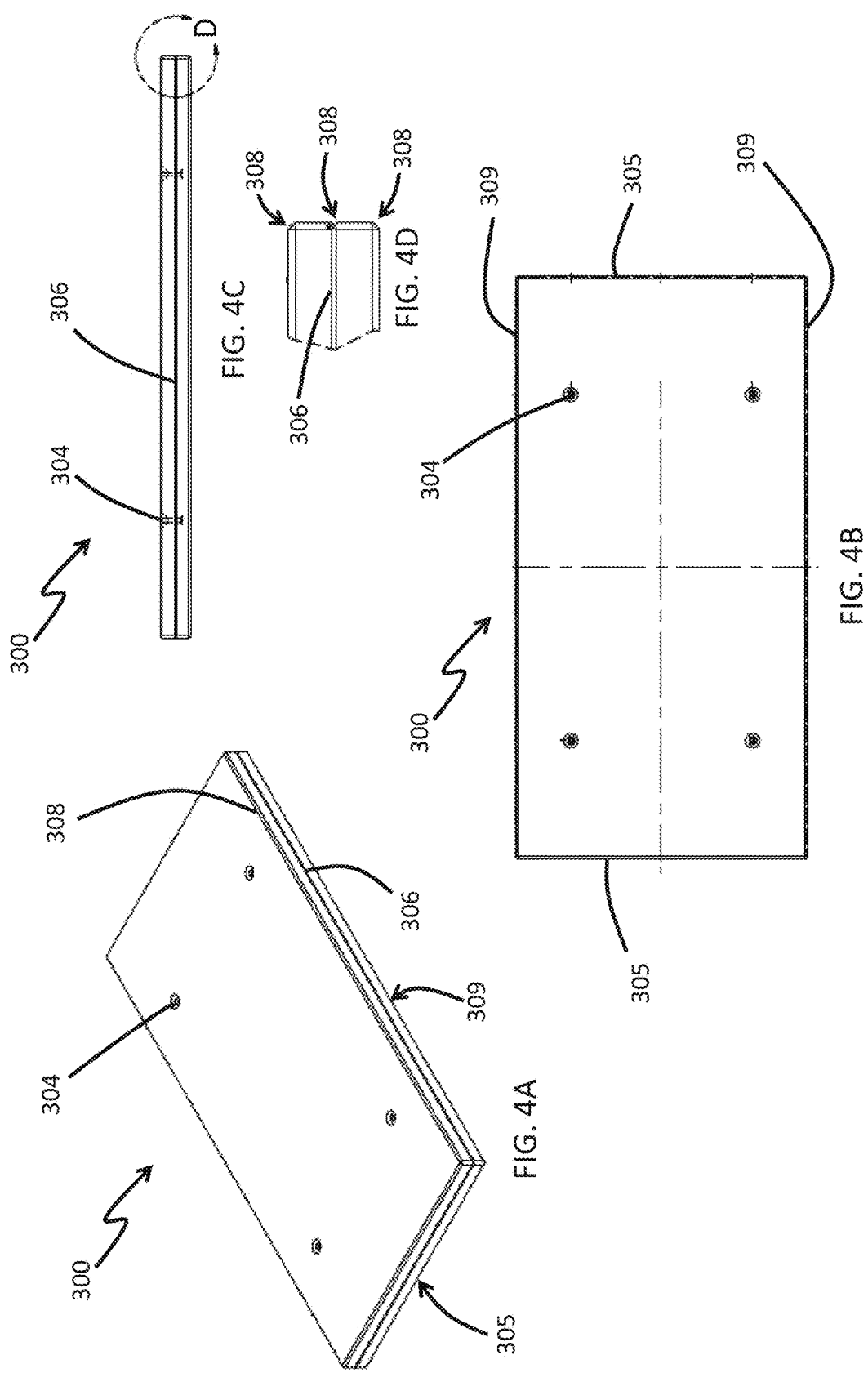

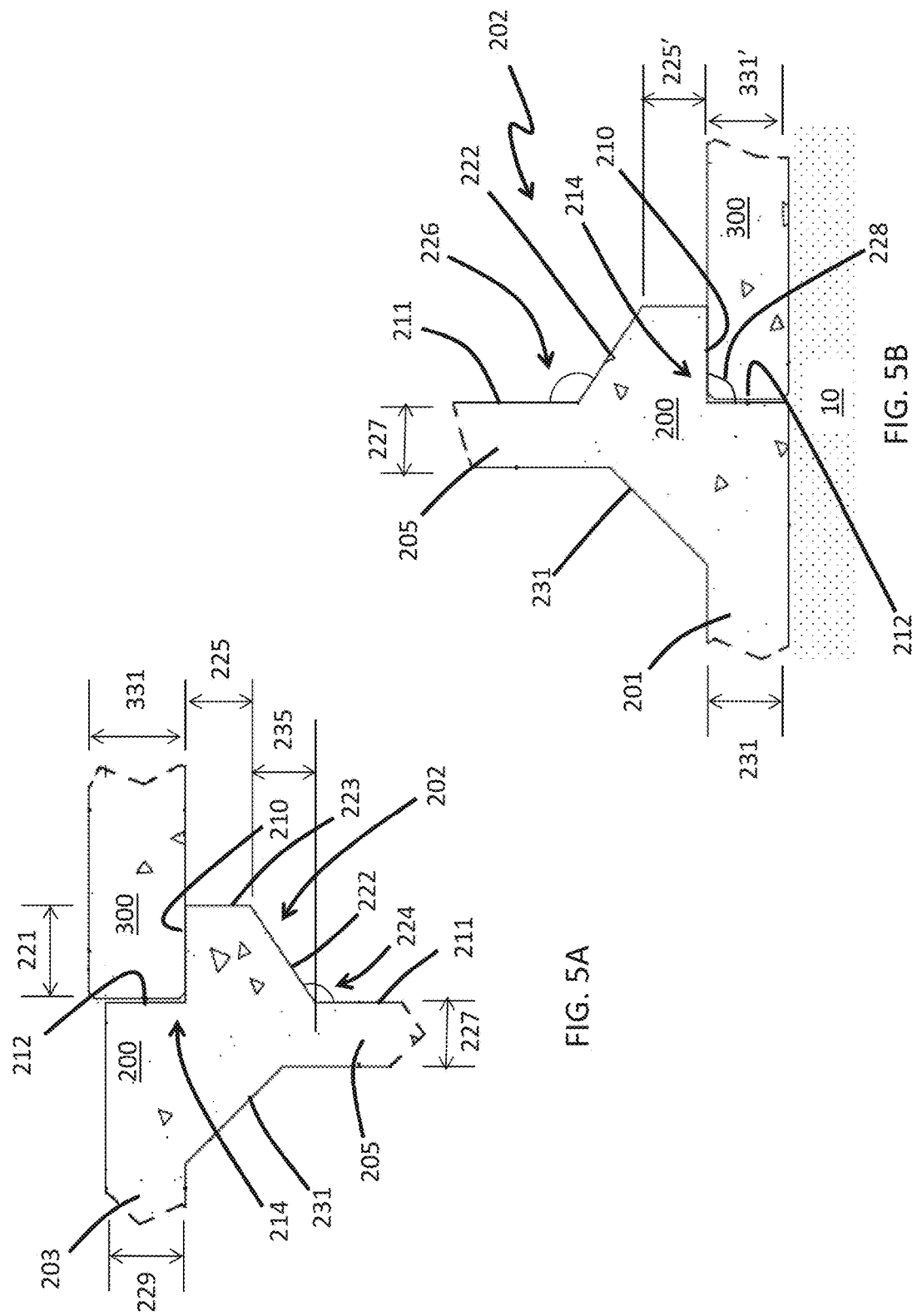

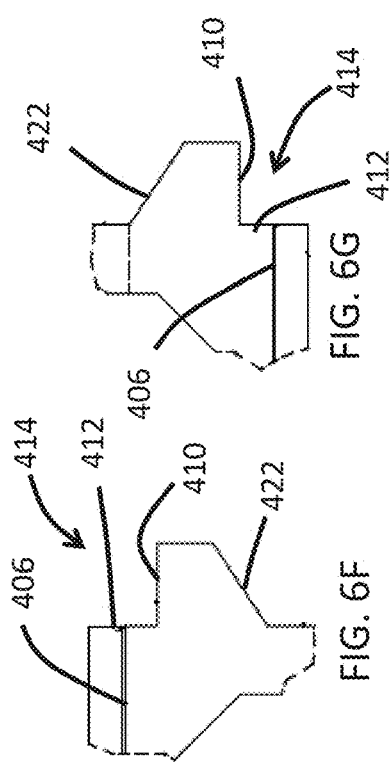
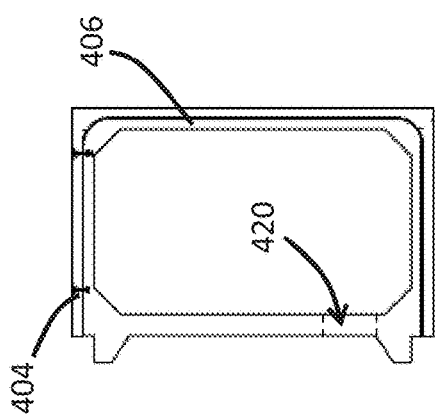
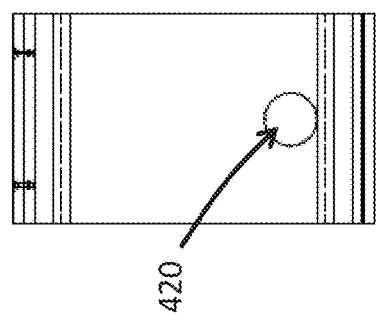
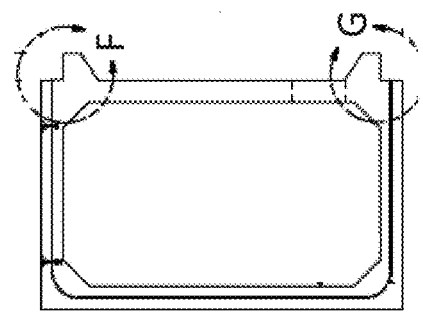
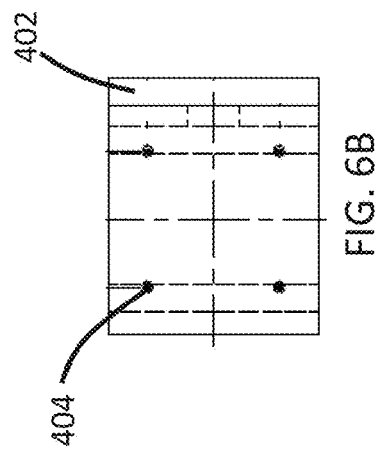
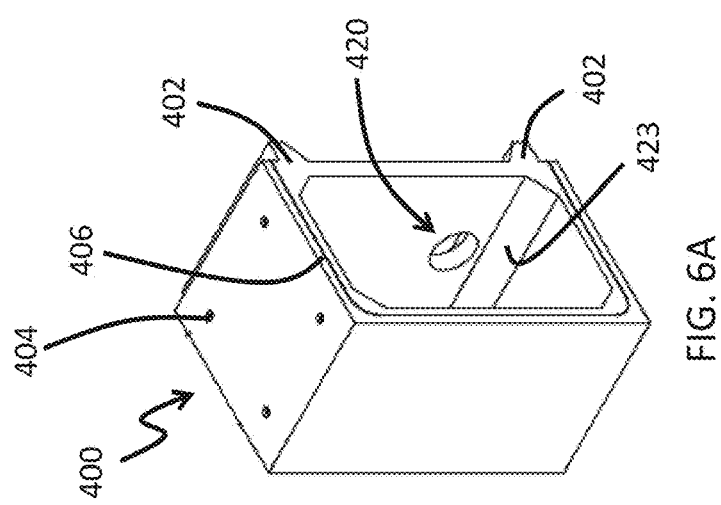

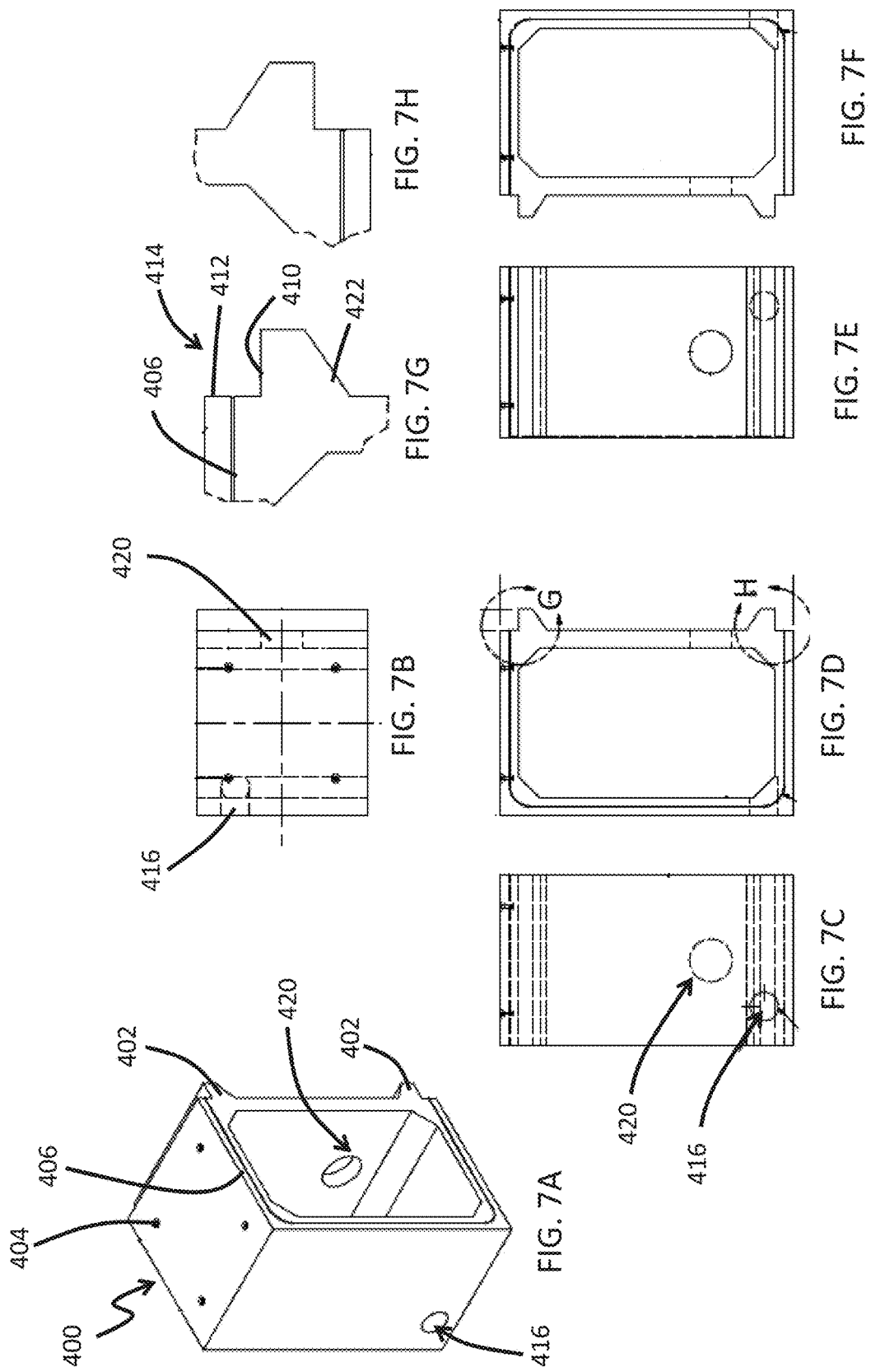

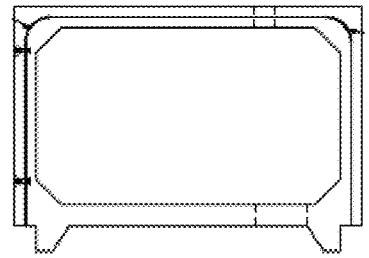
FIG. 8F
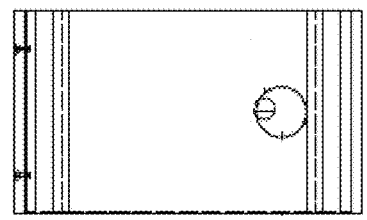
FIG. 8G
FIG. 8H
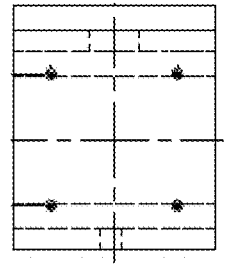
FIG. 8B
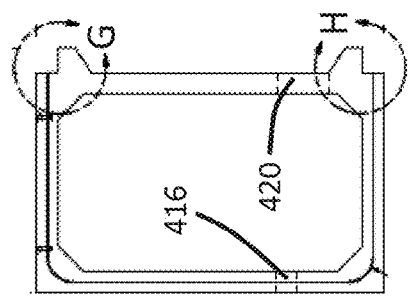
FIG. 8D
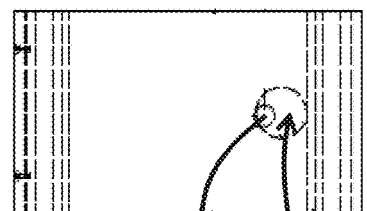
FIG. 8E
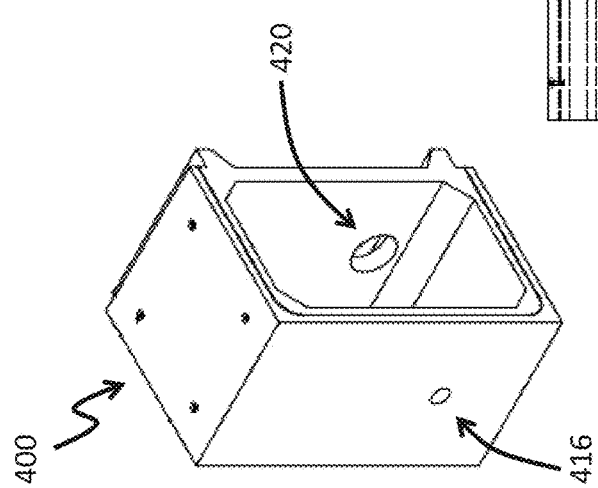
FIG. 8A
FIG. 8C

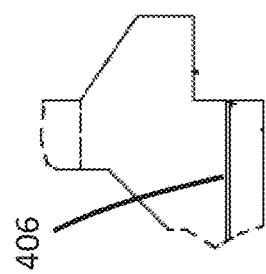
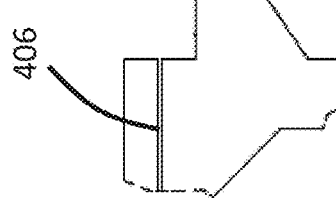
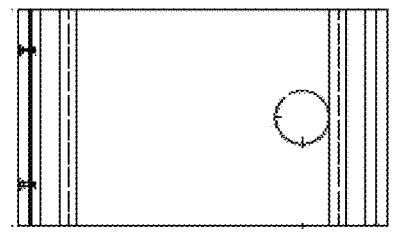
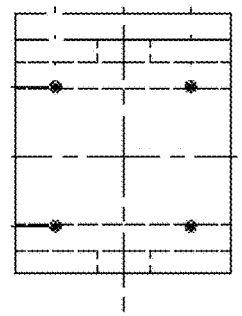
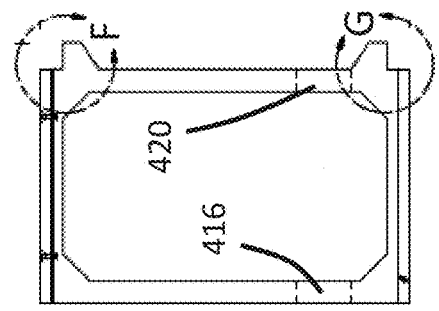
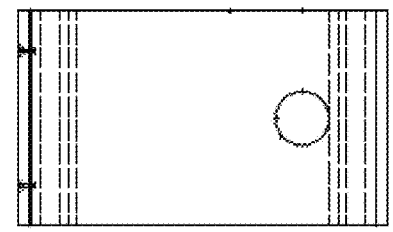
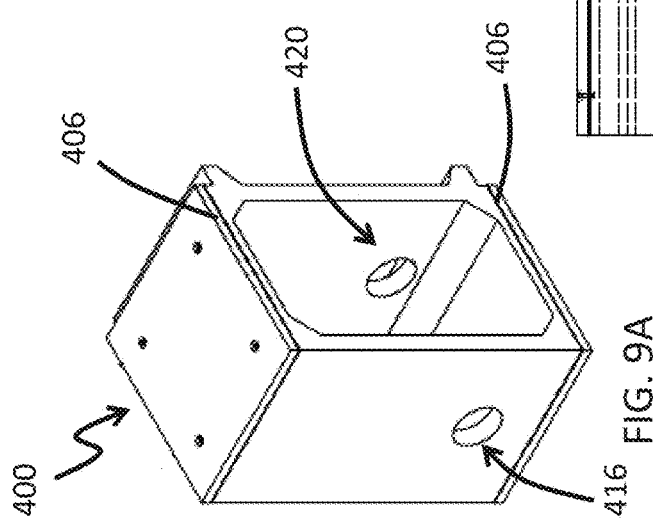

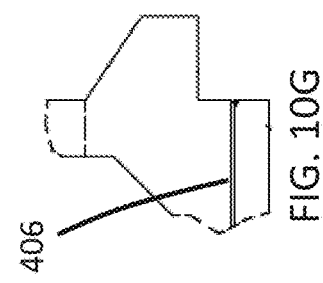
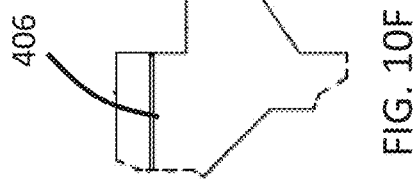
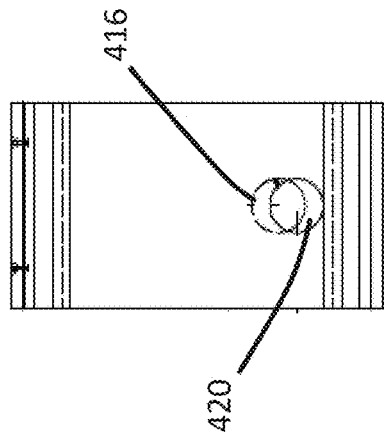
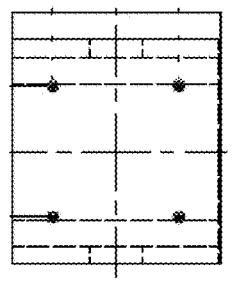
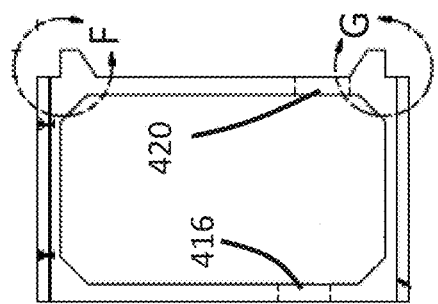
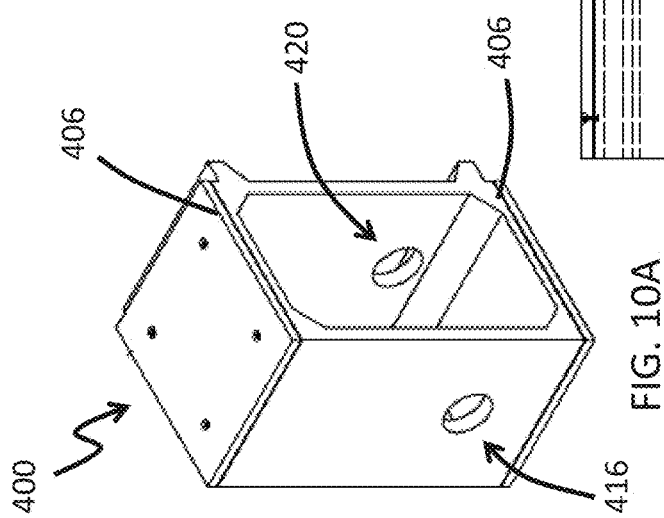
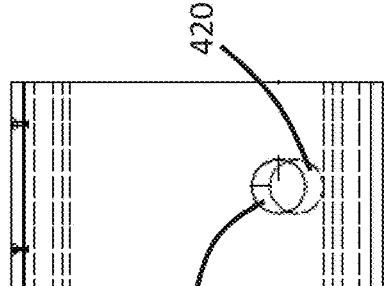

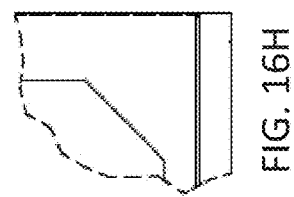
FIG. 16H
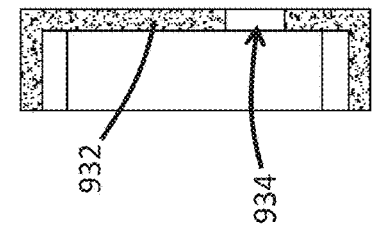
FIG. 16F
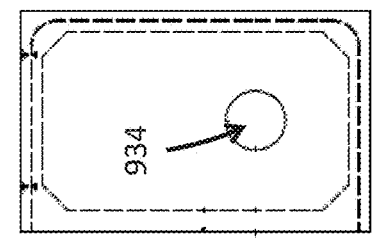
FIG. 16E
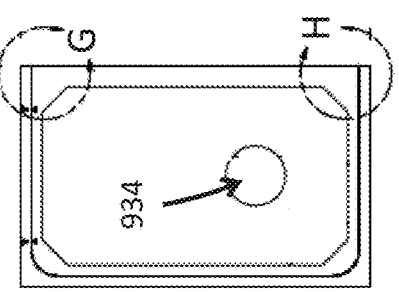
FIG. 16D
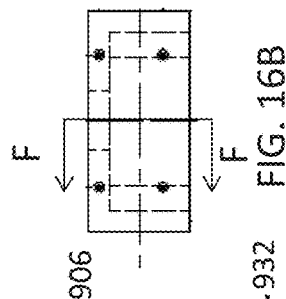
FIG. 16B
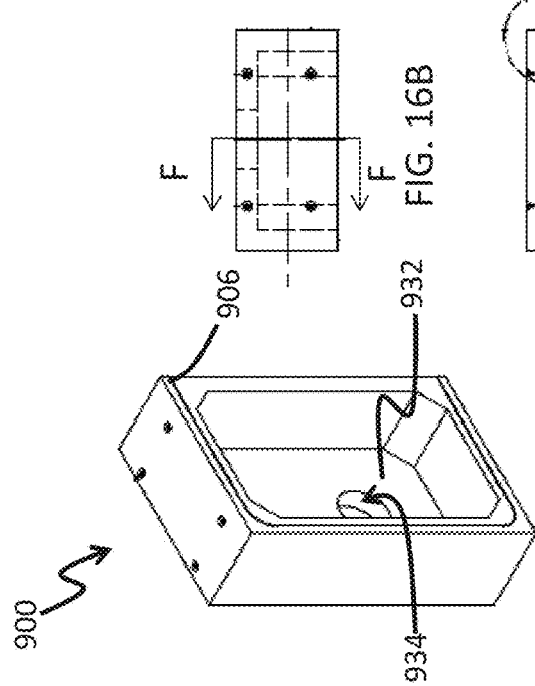
FIG. 16A / FIG. 16C
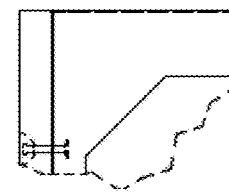
FIG. 16G

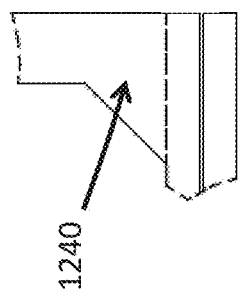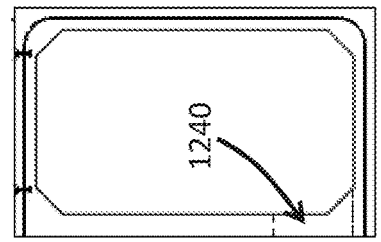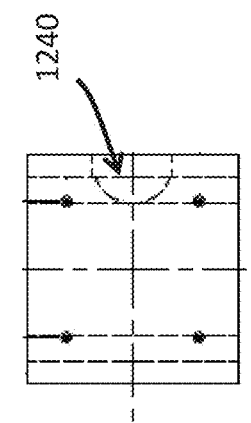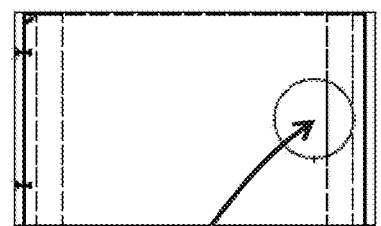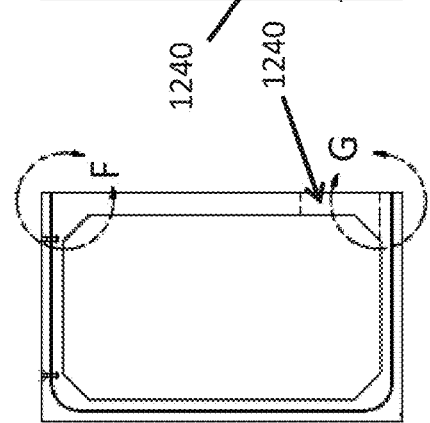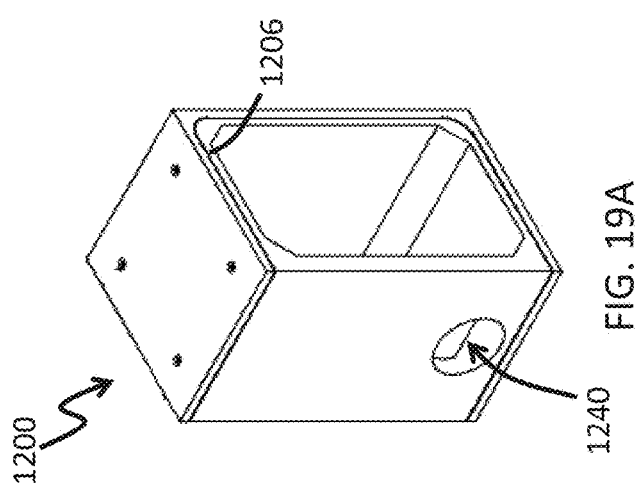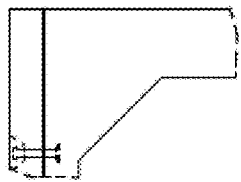

FIG. 22H
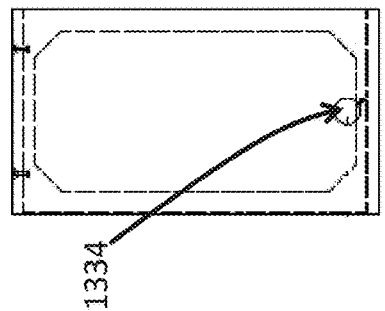
FIG. 22F
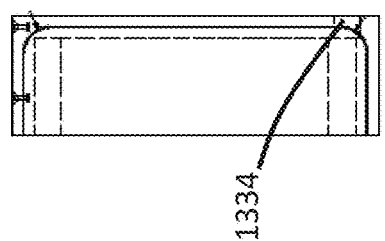
FIG. 22E
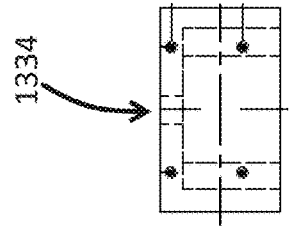
FIG. 22C
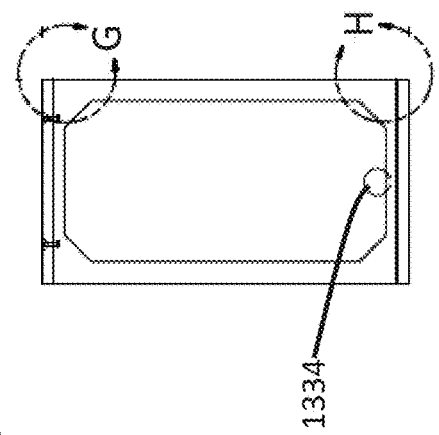
FIG. 22D
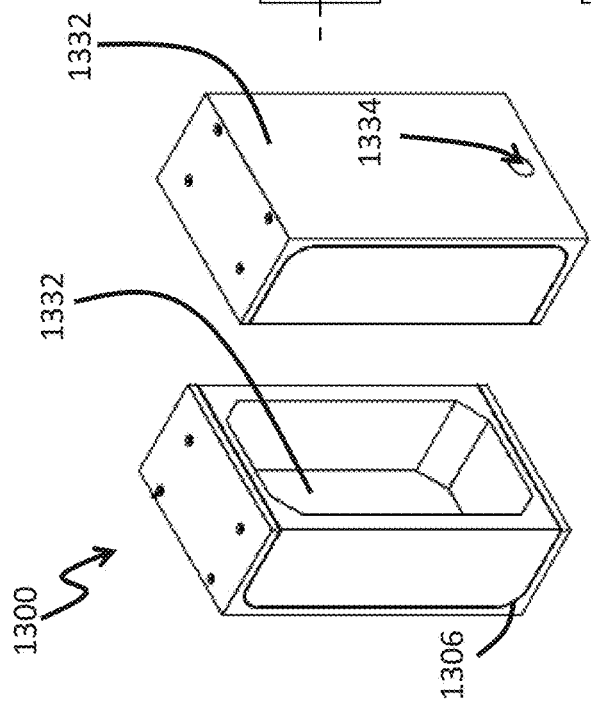
FIG. 22A
FIG. 22B
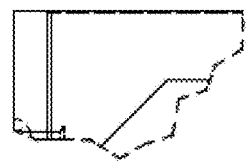
FIG. 22G

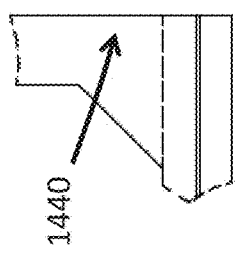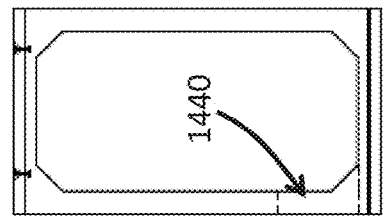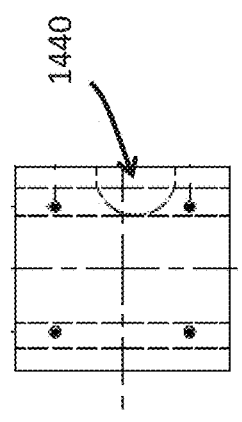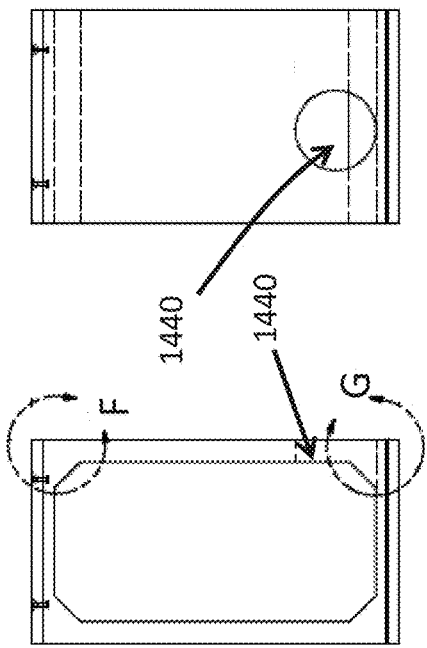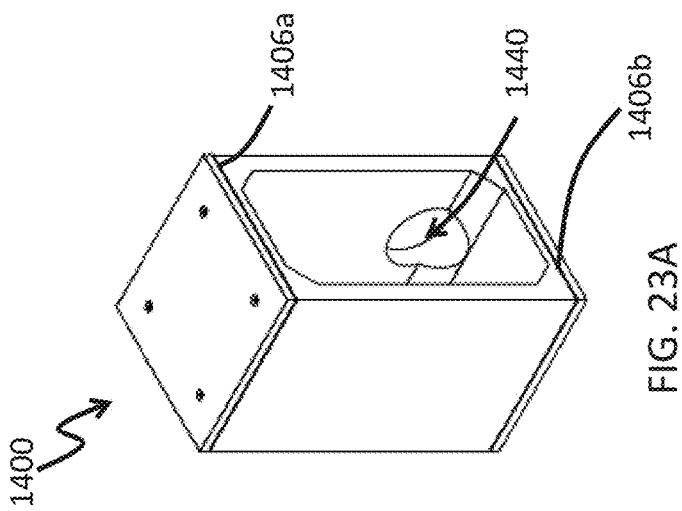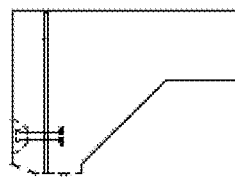

US 10,435,880 B1

MODULAR STORM WATER MANAGEMENT SYSTEMS AND METHODS OF ASSEMBLING THE SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to storm water management systems and methods of assembling storm water management systems.

Description of the Related Art

Urban development can replace a natural land surface (e.g., grassland) with a surface material (e.g., asphalt) that is impervious or less penetrable by water. The replacement of natural surfaces with surfaces that are less permeable to water can lead to problems associated with urban runoff. Urban runoff can cause surface water contamination to negatively impact receiving waters (e.g., beaches and bays). A need exists for managing storm water runoff from urban projects such as parking lots, streets, and other paved surfaces.

SUMMARY

Disclosed herein are embodiments of a method of constructing a storm water management system. In some aspects, the method includes positioning a first plurality of slabs end-to-end to form a first ribbon of slabs. The method further includes positioning a second plurality of slabs end-to-end to form a second ribbon of slabs, such that the first and second ribbons are aligned with one another and spaced apart to form a first opening between the first and second ribbons. The method further includes seating a first connecting column in the first opening such that a first bottom corbel extending from an outside surface of a first side wall of the first connecting column overlaps a first edge portion of the first ribbon and a second bottom corbel extending from an outside surface of a second side wall of the first connecting column overlaps a first edge portion of the second ribbon.

Also disclosed herein are embodiments of a modular storm water management system that includes a plurality of connecting columns and a plurality of slabs. Each of the plurality of connecting columns can include a base wall, a top wall, and a pair of opposing side walls that are spaced apart from one another and extend from the base wall to the top wall such that an interior space of the connecting column is surrounded by the base wall, the top wall, and the pair of opposing side walls. Each of the plurality of connecting columns can further include a first corbel, a second corbel, a third corbel, and a fourth corbel. The first corbel extends from an outside surface of a first one of the pair of opposing side walls. The first corbel extends in a direction that is away from the interior space of the connecting column. The first corbel includes a shelf surface and an abutment surface. In use, the shelf surface of the first corbel faces toward an underlying surface that supports the storm water management system. The second corbel extends from the outside surface of the first one of the pair of opposing side walls. The second corbel includes a shelf surface and an abutment surface. The shelf surface of the second corbel faces away from the shelf surface of the first corbel. The third corbel extends from an outside surface of a second one of the pair of opposing side walls. The third corbel extends in a direction that is away from the interior space of the connecting column. The third corbel includes a shelf surface and an abutment surface. In use, the shelf surface of the third corbel faces toward an underlying surface that supports the storm water management system. The fourth corbel extends from the outside surface of the second one of the pair of opposing side walls. The fourth corbel includes a shelf surface and an abutment surface. The shelf surface of the fourth corbel faces away from the shelf surface of the third corbel. Each of the plurality of slabs has a generally planar shape and a slab thickness that corresponds to a height of an end surface of the slab. In use, the abutment surface of at least one of the first corbels is adjacent to and extends along at least a portion of the end surface of at least one of the plurality of slabs.

Also disclosed herein are embodiments of a modular storm water management system that includes a plurality of connecting columns, a plurality of slabs, and a plurality of other modular components (e.g., end columns) that can be arranged with one another to form a storm water management system that performs one or more functions or uses selected from the group consisting of retention, detention, infiltration, and conveyance. In some embodiments, the modular storm water management system can be arranged to perform only one of the uses of retention, detention, infiltration, and conveyance. In some embodiments, the modular storm water management system can be arranged to perform more than one of the uses of retention, detention, infiltration, and conveyance.

BRIEF DESCRIPTION OF THE DRAWINGS

Embodiments of the present disclosure will now be described hereinafter, by way of example only, with reference to the accompanying drawings in which:

FIG. 3B illustrates a top view of the connecting column of FIG. 3A;

FIG. 3C illustrates an end view of the connecting column of FIG. 3A;

FIG. 3D illustrates a side view of the connecting column of FIG. 3A;

FIG. 3E illustrates an end view of the top corbel of FIG. 3C;

FIG. 3F illustrates an end view of the bottom corbel of FIG. 3C;

FIG. 4A illustrates a top perspective view of a slab;

FIG. 4B illustrates a top view of the slab of FIG. 4A;

FIG. 4C illustrates an edge view of the slab of FIG. 4A;

FIG. 4D illustrates an end view of a corner portion of the slab of FIG. 4C;

FIG. 5A illustrates a slab seated on a top corbel of a connecting column;

FIG. 5B illustrates a slab nested with a bottom corbel of a connecting column;
FIG. 6A illustrates a perspective view of an end column;
FIG. 6B illustrates a top view of the end column of FIG. 6A;
FIG. 6C illustrates an end view of the end column of FIG. 6A;
FIG. 6D illustrates a side view of the end column of FIG. 6A;
FIG. 6E illustrates an opposing end view of the end column of FIG. 6C;
FIG. 6F illustrates an end view of the top corbel of FIG. 6C;
FIG. 6G illustrates an end view of the bottom corbel of FIG. 6C;
FIG. 7A illustrates a perspective view of an end column;
FIG. 7B illustrates a top view of the end column of FIG. 7A;
FIG. 7C illustrates a side view of the end column of FIG. 7A;
FIG. 7D illustrates an end view of an end column of FIG. 7A;
FIG. 7E illustrates an opposing side view of the end column of FIG. 7C;
FIG. 7F illustrates an opposing end view of the end column of FIG. 7D;
FIG. 7G illustrates an end view of the top corbel of FIG. 7D;
FIG. 7H illustrates an end view of the bottom corbel of FIG. 7D;
FIG. 8A illustrates a perspective view of an end column;
FIG. 8B illustrates a top view of the end column of FIG. 8A;
FIG. 8C illustrates a side view of the end column of FIG. 8A;
FIG. 8D illustrates an end view of an end column of FIG. 8A;
FIG. 8E illustrates an opposing side view of the end column of FIG. 8C;
FIG. 8F illustrates an opposing end view of the end column of FIG. 8D;
FIG. 8G illustrates an end view of the top corbel of FIG. 8D;
FIG. 8H illustrates an end view of the bottom corbel of FIG. 8D;
FIG. 9A illustrates a perspective view of an end column;
FIG. 9B illustrates a top view of the end column of FIG. 9A;
FIG. 9C illustrates a side view of the end column of FIG. 9A;
FIG. 9D illustrates an end view of an end column of FIG. 9A;
FIG. 9E illustrates an opposing side view of the end column of FIG. 9C;
FIG. 9F illustrates an end view of the top corbel of FIG. 9D;
FIG. 9G illustrates an end view of the bottom corbel of FIG. 9D;
FIG. 10A illustrates a perspective view of an end column;
FIG. 10B illustrates a top view of the end column of FIG. 10A;
FIG. 10C illustrates a side view of the end column of FIG. 10A;
FIG. 10D illustrates an end view of an end column of FIG. 10A;
FIG. 10E illustrates an opposing side view of the end column of FIG. 10C;
FIG. 10F illustrates an end view of the top corbel of FIG. 10D;
FIG. 10G illustrates an end view of the bottom corbel of FIG. 10D.

FIG. 16A illustrates a perspective view of an open-ended module;

FIG. 16B illustrates a top view of the open-ended module of FIG. 16A;

FIG. 16C illustrates an end view of the open-ended module of FIG. 16A;

FIG. 16D illustrates a side view of the open-ended module of FIG. 16A;

FIG. 16E illustrates an opposing end view of the open-ended module of FIG. 16C;

FIG. 16F illustrates a cross-sectional view of the open-ended module of FIG. 16B;

FIG. 16G illustrates an end view of a top corner of the open-ended module of FIG. 16C;

FIG. 16H illustrates an end view of the bottom corner of the open-ended module of FIG. 16C;

FIG. 19A illustrates a perspective view of a communicating spacer module;

FIG. 19B illustrates a top view of the communicating spacer module of FIG. 19A;

FIG. 19C illustrates an end view of the communicating spacer module of FIG. 19A;

FIG. 19D illustrates a side view of the communicating spacer module of FIG. 19A;

FIG. 19E illustrates an opposing end view of the communicating spacer module of FIG. 19C;

FIG. 19F illustrates an end view of a top corner of the communicating spacer module of FIG. 19C;

FIG. 19G illustrates an end view of the bottom corner of the communicating spacer module of FIG. 19C;

FIG. 22A illustrates a perspective view of a communicating wrapped-seam end module;

FIG. 22B illustrates an opposing perspective view of the communicating wrapped-seam end module of FIG. 22A;

FIG. 22C illustrates a top view of the multi-seamed spacer module of FIG. 22A;

FIG. 22D illustrates an end view of the multi-seamed spacer module of FIG. 22A;

FIG. 22E illustrates a side view of the multi-seamed spacer module of FIG. 22A;

FIG. 22F illustrates an opposing end view of the multi-seamed spacer module of FIG. 22D;

FIG. 22G illustrates an end view of a top corner of the multi-seamed spacer module of FIG. 22D;

FIG. 22H illustrates an end view of the bottom corner of the multi-seamed spacer module of FIG. 22D;

FIG. 23A illustrates a perspective view of a communicating multi-seamed spacer module;

FIG. 23B illustrates a top view of the communicating multi-seamed spacer module of FIG. 23A;

FIG. 23C illustrates an end view of the communicating multi-seamed spacer module of FIG. 23A;

FIG. 23D illustrates a side view of the communicating multi-seamed spacer module of FIG. 23A;

FIG. 23E illustrates an opposing end view of the communicating multi-seamed spacer module of FIG. 23C;

FIG. 23F illustrates an end view of a top corner of the communicating multi-seamed spacer module of FIG. 23C;

FIG. 23G illustrates an end view of the bottom corner of the communicating multi-seamed spacer module of FIG. 23C;

DETAILED DESCRIPTION

Overview

Storm water management systems disclosed herein can mitigate problems associated with urban runoff by replicating or approximating one or more features of a natural surface. For example, in some aspects the storm water management systems disclosed herein can be perform a retention function in which storm water is collected and held to be pumped out or removed from the system at a later time. In some aspects, the storm water management systems disclosed herein can perform a detention function in which storm water is detained in the system and then released slowly into a pipe or waterway. The detention use or feature of the storm water management system disclosed herein can allow storm water to enter the system at a volumetric flow rate that is higher than the rate of release of the collected water from the storm water management system. In some arrangements, the storm water management systems disclosed herein can perform a conveyance function in which storm water (or other flowing water) is moved from one location to another location. For example, the storm water management system can be arranged to provide a flow path underneath and across a paved surface. In some embodiments, the storm water management system can have an infiltration use or function in which storm water is slowly allowed to infiltrate out of the system and into the soil that is underneath or adjacent to the system. In some arrangements, the storm water management systems disclosed herein can perform one or more of the functions or uses of retention, detention, conveyance, and infiltration.

Accordingly, disclosed herein are embodiments of modular storm water management systems, and methods of installation and use of the storm water management systems. The embodiments disclosed herein can be described in the context of an assembly comprised of a plurality of concrete open columns and slabs that are installed underneath a paved surface. However, the embodiments and inventions herein can also be applied to other types of environments, and comprised of materials other than concrete, and the particular structures and materials do not limit the disclosure.

Modular Storm Water Management System

Figure 1:
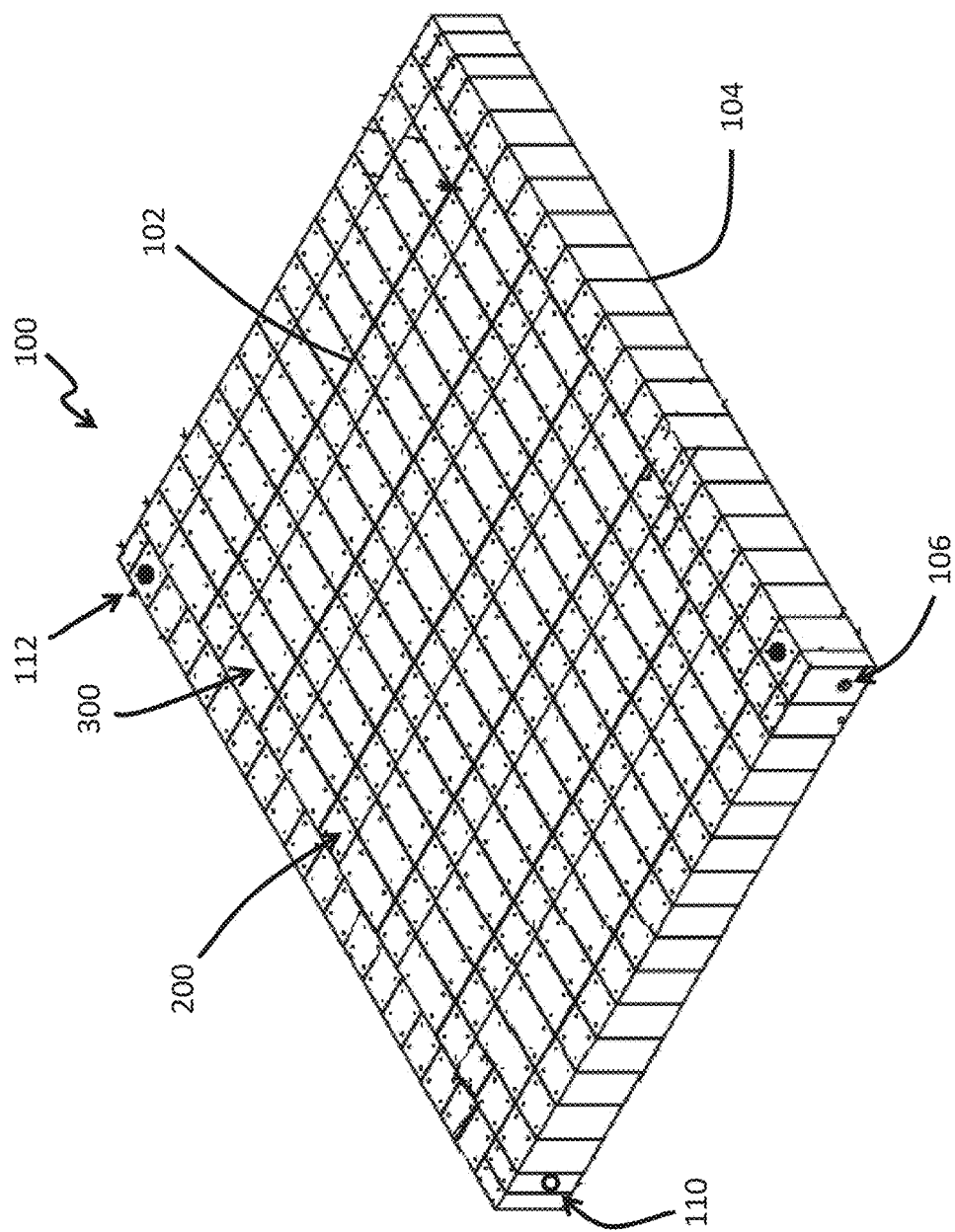
FIG. 1 illustrates a perspective view of a storm water management system.

FIG. 1 illustrates a perspective view of a storm water management system 100 of the present disclosure. The storm water management system 100 can be assembled and buried underground beneath a paved surface or other urban project that is constructed on top of the storm water management system 100 after the system 100 has been assembled and buried underground. The storm water management system 100 can be arranged as a network or array of open connecting columns 200 and slabs 300. In the embodiment shown in FIG. 1, the storm water management system 100 is arranged as an array of alternating rows of open connecting columns 200 and slabs 300. The connecting columns 200 and slabs 300 can form a deck 102 on which a paved surface is supported. In some embodiments, a paved surface is installed over the storm water management system 100 after the assembled storm water management system 100 has been buried underground. As discussed herein, the connecting columns 200 and slabs 300 can form a floor 104. The floor 104 can be interposed between the deck 102 and the underlying surface that supports the storm water management system 100. In some arrangements, the floor 104 of the storm water management system 100 can be in direct contact with the underlying surface that supports the storm water management system 100.

With continued reference to FIG. 1, the storm water management system 100 can include an outlet opening 106 through which water contained within the storm water management system 100 can exit the storm water management system 100. An outlet pipe 117 (shown in FIG. 26) can pass through the outlet opening 106 to provide a flow path between the storm water management system 100 and a downstream plumbing system (shown in FIG. 24). The storm water management system 100 can include an inlet opening 110 through which water outside of the storm water management system 100 can enter the storm water management system 100. An inlet pipe 116 (shown in FIG. 25) can pass through the inlet opening 110 to provide a flow path between an upstream plumbing system (shown in FIG. 24) and the storm water management system 100. As discussed herein, the storm water management system 100 can include one or more access ports 112. The access port 112 can be sized to allow a person to pass through the access port 112 to gain access to the space between the deck 102 and the floor 104 of the storm water management system 100.

Figure 2:
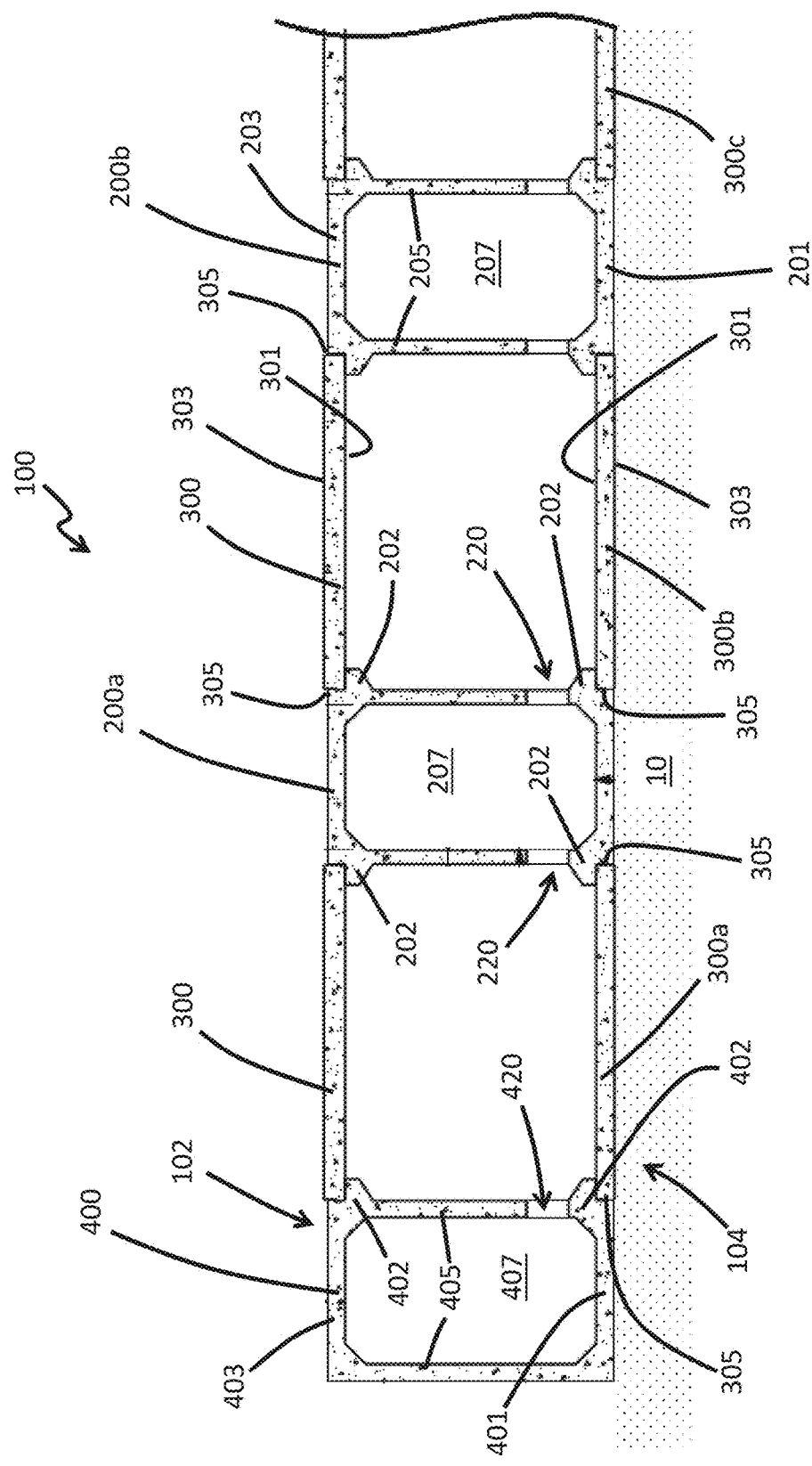
FIG. 2 illustrates a cross-sectional view of a portion of an assembled storm water management system.

FIG. 2 illustrates a cross-sectional view of a portion of a storm water management system 100. The storm water management system 100 can include modules such as open connecting columns 200, slabs 300, and end columns 400. The storm water management system 100 can be arranged to form a network of interconnected spaces as described herein. The storm water management system 100 can be arranged to function like an underground lake, allowing water to be distributed across the internal space enclosed by the storm water management system 100. The modules of the storm water management system 100 can be arranged in a variety of different configurations depending on the desired footprint or use (e.g., conveyance, retention, detention, infiltration) of the storm water management system 100.

The connecting columns 200 can have a base wall 201, a top wall 203, and a pair of opposing sidewalls 205 that connect the base wall 201 and the top wall 203. When the modular storm water management system 100 is assembled, the base wall 201 is adjacent the underlying surface 10. When the modular storm water management system 100 is assembled, the base wall 201 is interposed between the top wall 203 and the underlying surface 10. The end column 400 can have similar corresponding structures, as indicated in FIG. 2. For the sake of clarity, corresponding features of different modules described herein will be indicated using corresponding reference numbers. For example, the end column 400 can have a base wall 401 that is similar to the base wall 201 of the connecting column 200, except as differently described herein.

The connecting columns 200 can include corbels 202 that extend from the sidewalls 205. The corbels 202 extend from the surface of the sidewall 205 that faces away from the interior space of the connecting column 200. The corbels 202 are disposed on the surface of the sidewall 205 that faces away from the opposing sidewall 205 of the connecting column 200. The corbels 202 support or nest onto the slabs 300, as shown in FIG. 2. The corbels 202 near the base wall 201 of the column 200 nest over the slabs 300 that are adjacent the underlying surface 10. The corbels 202 near the base wall 201 nest over the slabs 300 of the deck 102. The corbels 202 near the top wall 203 support the slabs 300 of the deck 102. The slabs 300 of the deck 102 are spaced apart from the slabs 300 of the floor 104 by the sidewalls 205, as shown in FIG. 2.

The connecting columns 200 can have an open structure. The base wall 201, top wall 203, and sidewalls 205 can surround an interior space 207 of the connecting columns 200. The connecting columns 200 can form a duct when positioned appropriately with other connecting columns 200. For example, the connecting columns 200 shown in FIG. 2 would form a rectangular duct structure when the connecting columns 200 are aligned end-to-end with one another such that the interior space 207 of each of the connecting columns 200 is aligned with the interior spaces 207 of the other connecting columns 200. The two connecting columns 200 shown in FIG. 2 are not aligned end-to-end with one another. The two connecting columns 200 shown in FIG. 2 would form two parallel rectangular ducts if each of these two connecting columns 200 were aligned end-to-end with other connecting columns 200. The end columns 400 can form similar duct-like structures.

The ducts formed by the connecting columns 200 can help distribute water within the modular storm water management system 100. For example, a duct formed by a plurality of connecting columns 200 arranged end-to-end can distribute water along the length of the duct. The connecting columns 200 can include one or more connecting-column ports 220 that provide a flow path across the side wall 205. The connecting-column ports 220 can help distribute water across the duct-like structure of the end-to-end aligned connecting columns 200, thereby allowing such distributed water to reach adjacent regions of the storm water management system 100 that are covered by the slabs 300. Water within the storm water management system 100 can be distributed throughout the system 100 by flowing along the duct-like structures of the connecting columns 200 and slabs 300 and flowing between these duct-like structures by flowing through the connecting-column ports 220. In the illustrated embodiment, the connecting column 200 includes a pair of connecting-column ports 220 that are similar in size to one another and disposed across from one another on the opposing side walls 205. The illustrated connecting-column ports 220 are positioned adjacent the corbel 202 near the base wall 201. In some embodiments, the connecting-column port 220 can be sized or positioned at a location other than that illustrated in FIG. 2, as discussed herein.

As shown in FIG. 2, the end column 400 can include an end-column port 420 that provides a flow path across a side wall 405 of the end column 400. The end-column port 420 can help distribute water within the storm water management system 100, as described herein. In the illustrated embodiment, the end-column port 420 passes through the side wall 405 from which the corbel 402 extends and is positioned adjacent the corbel 402 that is near the floor 104 of the storm water management system 100. The illustrated end-column port 420 is also similar in size to the connecting-column ports 220, and is axially aligned with the connecting-column ports 220. In some embodiments, the end-column port 420 can be positioned at a location other than that illustrated in FIG. 2, as discussed herein. In some embodiments, there is desirably no corbel on the outer side wall 405 of the end column 400, as shown in FIG. 2. In some embodiments, the outer side wall 405 of the end column 400 can include a corbel.

With continued reference to FIG. 2, the slabs 300 can have an inner surface 301 that faces toward the enclosed space of the storm water management system 100 and an outer surface 303 that faces away from the enclosed space of the storm water management system 100. The slabs can have end surfaces 305 that face toward the connecting columns 202 (or end columns 402) when the slab 300 is seated onto or nested with the corbels 202, 402. The slabs 300 can have side surfaces 309 (shown in FIGS. 4A and 4B) that connect the inner surface 301 with the outer surface 303, and the end surfaces 305 with one another.

The storm water management system 100 can be assembled by positioning the modules relative to one another, as discussed herein. The system 100 modules can be selected and arranged according to the desired function(s) (e.g., retention, detention, conveyance, infiltration) of the storm water management system 100. The system 100 modules can be selected and arranged according to the desired footprint of the storm water management system 100. Referring to FIG. 2, the storm water management system 100 can be assembled by positioning a first slab 300a and a second slab 300b on the underlying surface 10 such that the first and second slabs 300a, 300b are spaced apart from one another with the outer surface 303 of the first and second slabs 300a, 300b facing toward the underlying surface 10. A first connecting column 200a can be seated into an open space formed between the first and second slabs 300a, 300b such that the corbels 202 of the first connecting column 200a nest over a portion of the inner surface 301 that is adjacent the end surfaces 305 of the first and second slabs 300a, 300b. A sealant can be applied at the interface between adjacent columns 200 and slabs 300. The sealant can be used between any adjacent modules of the system 100. In some embodiments, the sealant impedes or blocks water flow between adjacent columns 200 and slabs 300 or other adjacent modules of the system 100. In some embodiment, the sealant can provide structural reinforcement to impede the adjacent modules from moving relative to one another. In some embodiments, the columns 200 can include overlapping portions such as disclosed in U.S. Pat. No. 8,708,601, entitled "BOX CULVERT," which issued Apr. 29, 2014, and is incorporated by reference herein in its entirety.

The assembly of storm water management system 100 can be extended over the underlying surface 10 by positioning a third slab 300c on the underlying surface 10 and spaced apart from the second slab 300b. A second connecting column 200b can be seated into the open space between the second and third slabs 300b, 300c. This process can be repeated to continue extending the assembly of the system 100 over the underlying surface 10. The system 100 can be extended and assembled to have a desired footprint, such as to match a corresponding urban project (e.g., paved surface) that will be installed over the system 100.

The storm water management system 100 can be bounded or surrounded at its periphery by one or more end column 400 modules or other modules, as discussed herein. As shown in FIG. 2, an end column 400 can be positioned adjacent to the first slab 300a. The corbel 402 of the end column 400 can nest over a portion of the inner surface 301 that is adjacent the end surfaces 305 of the first slabs 300a. The storm water management system 100 can be covered or enclosed by positioning slabs 300 on the corbels 202, 402 that are opposite the corbels 202, 402 that are nested over the slabs 300 on the underlying surface 10. The storm water management system 100 can be enclosed by positioning slabs 300 onto the corbels 202, 402 near the deck 102 such that a portion of the inner surface 301 that is adjacent the end surface 305 rests on the corbel 202, 402, as shown in FIG. 2.

For the sake of clarity, the slabs 300 in contact with the underlying surface 10 are referred to herein as the "bottom"

slabs 300, while the slabs 300 at the opposite side of the storm water management system 100 are referred to herein as the "top" slabs 300. Similarly, corbels 202, 402 that are nested over the bottom slabs 300 are referred to as "bottom" corbels, while corbels 202, 402 that support the top slabs 300 are referred to as "top" corbels.

Figure 3A:
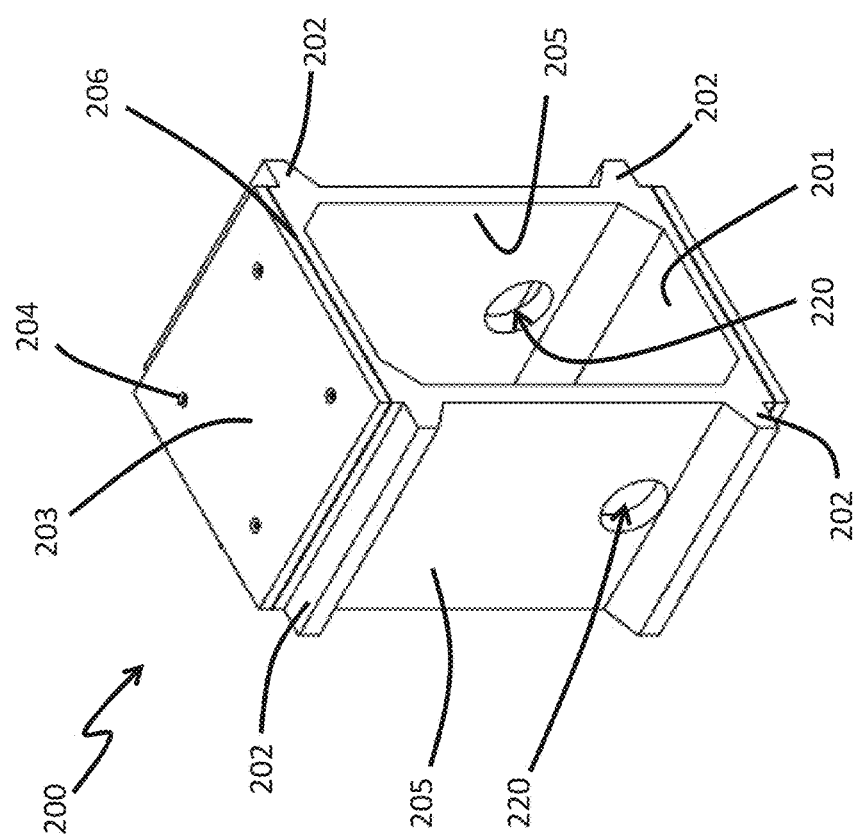
FIG. 3A illustrates a perspective view of a connecting column.

FIG. 3A shows an isometric view of a connecting column 200 of the storm water management system 100. The illustrated connecting column 200 has four corbels 202, with each side of the column having a top corbel 202 and a bottom corbel 202. The connecting column 200 can have two column ports 220 disposed on opposing side walls 205 of the connecting column 200. In the illustrated embodiment, the connecting column 200 has a pair of similarly-sized column ports 220 that are disposed near the bottom corbels 202. The column ports 220 can be aligned axially with one another, as shown in the side view of the connecting column 200 in FIG. 3D. The connecting column 200 can have four anchor pins 204 at the top end of the connecting column 200. The anchor pins 204 can provide anchoring points for moving, hauling, lifting, or otherwise positioning the connecting column 200. The connecting column 200 can include a seam 206. The seam 206 can be a groove. The seam 206 can be used to join or seal adjacent modules to one another.

FIG. 3B shows a top view of the connecting column 200 shown in FIG. 3A. FIG. 3C shows an end view of the connecting column 200 shown in FIG. 3A. FIG. 3D shows a side view of the connecting column 200 shown in FIG. 3A. FIG. 3E shows an end view of a top corbel 202 of the connecting column 200 shown in FIG. 3A. FIG. 3F shows an end view of a bottom corbel 202 of the connecting column 200 shown in FIG. 3A. For the sake of clarity, the surface of the top corbel 202 that supports the slab 300 against gravity when the slab 300 is seated onto the top corbel 202 is referred to herein as the shelf surface 210, as indicated in FIG. 3E. Similarly, the surface of the bottom corbel 202 that rests on the bottom slab 300 when the connecting column 200 is seated into the open space between adjacent and spaced apart slabs 300 is referred to herein as a shelf surface 210, as indicated in FIG. 3F. With continued reference to FIGS. 3E and 3F, the corbel 210 can have an abutment surface 212 that can be more or less orthogonal to the shelf surface 210. The shelf and abutment surfaces 210, 212 of the corbels 202 can form a notch 214. The notch 214 can be sized to receive at least a portion of an edge of the slab 300, as discussed herein.

FIG. 4A shows an isometric view of a slab 300 of the storm water management system 100. The slab 300 can include a seam 306. The seam 306 of the slab 300 can be seam a groove and can be used to join or seal the slab 300 with an adjacent module, as discussed herein with regard to the seam 206 of the connecting column 200. In the illustrated embodiment, the seam 306 extends along the end surfaces 305 and the side surfaces 309. The slab 300 can include one or more anchoring points 304. The anchoring points 304 of the slab 300 can be can be similar to the anchor points 204 of the connecting column 200. The anchor points 304 of the slab 300 can be used to move, haul, position, or lift the slab 300.

FIG. 4B shows a top view of the slab 300 shown in FIG. 4A. FIG. 4C shows an edge or side view of the slab 300 shown in FIG. 4A. FIG. 4D shows a side view of the portion of the slab 300 indicated by the section D shown in FIG. 4C. The slab can include one or more chamfered edges 308, as shown in FIG. 4D.

FIG. 5A shows an end cross-sectional view of a slab 300 seated into a notch 214 of a top corbel 202. The shelf 210 of the top corbel 202 can have a shelf width 221 corresponding to the width of the overlap between the interior surface 301 of the slab 300 and the shelf surface 210 of the top corbel 202. The top corbel 202 can have a canted surface 222 that forms a top corbel angle 224 with an exterior surface 211 the connecting column 200, as indicated in FIG. 5A. The top corbel 202 can have a spacer surface 223 that extends from the canted surface 222 to the shelf surface 210. The spacer surface 223 can have a spacer width 225 as indicated in FIG. 5A. The shelf width 221, the top corbel angle 224, and the spacer width 225 can be selected so that the corbel 202 can support a load that includes the weight of the slab and the weight of the any material that is supported by the slab 300. The sidewall 205 can have a side wall thickness 227, and the top wall 203 can have a top wall thickness 229, as indicated in FIG. 5A. The side wall and top wall thicknesses 227, 229 can be selected so that the connecting column 200 can support the loads applied to the connecting column 200. The connecting column 200 can have one or more interior canted surfaces 231. FIG. 5A shows an interior canted surface 231 that extends between the interior surfaces of the top wall 203 and the side wall 205. The slab 300 can have a slab thickness 333, and the canted surface 222 can have a canted surface height 335, as indicated in FIG. 5A.

In some embodiments, the shelf width 221 is 12 inches. In some embodiments, the shelf width 221 is 6 inches, 8 inches, 10 inches, 12 inches, 14 inches, 16 inches, 20 inches, 24 inches, 36 inches, or a value between the aforementioned values. In some embodiments, the spacer width 225 is 8 inches. In some embodiments, the spacer width 225 is 4 inches, 6 inches, 8 inches, 10 inches, 12 inches, 14 inches, 16 inches, 20 inches, 24 inches, or any value between the aforementioned values. In some embodiments, the side wall thickness 227 is 8 inches. In some embodiments, the side wall thickness 227 is 4 inches, 6 inches, 8 inches, 10 inches, 12 inches, 14 inches, 16 inches, 20 inches, 24 inches, or any value between the aforementioned values. In some embodiments, the top wall thickness 229 is 10 inches. In some embodiments, the top wall thickness 229 is 4 inches, 6 inches, 8 inches, 10 inches, 12 inches, 14 inches, 16 inches, 20 inches, 24 inches, 36 inches, or any value between the aforementioned values. In some embodiments, the canted surface height 235 is 8 inches. In some embodiments, the canted surface height 235 is 4 inches, 6 inches, 8 inches, 10 inches, 12 inches, 14 inches, 16 inches, 20 inches, 24 inches, or any value between the aforementioned values. In some embodiments, the canted surface height 235 is 8 inches. In some embodiments, the canted surface height 235 is 4 inches, 6 inches, 8 inches, 10 inches, 12 inches, 14 inches, 16 inches, 20 inches, 24 inches, or any value between the aforementioned values.

FIG. 5B shows an end view of a slab 300 seated into a notch 214 of a bottom corbel 202. The bottom corbel 202 can be similar to the top corbel 202, except as differently described herein. The bottom corbel 202 can have a canted surface 222 that forms a bottom corbel angle 226 with the exterior surface 211 of the connecting column 200, as indicated in FIG. 5B. In the illustrated embodiment, the top corbel angle 224 and the bottom corbel angle 226 are both approximately 135 degrees. In some variants the top corbel angle 224 can have a value different from that of the bottom corbel angle 226. In some arrangements the top angle 224 or bottom corbel angle 226 can be with the range of 110 degrees and 160 degrees. The notch 214 can have a notch angle 228 formed between the abutment surface 212 and the shelf surface 210. The notch angle 228 can be between 88 and 92 degrees, between 85 and 95 degrees, between 80 and 100 degrees, and between 75 and 105 degrees. FIG. 5B shows an interior canted surface 223 extends between the side wall 205 and the base wall 201.

In some embodiments, the slab thickness 331 of the top slab 300 is 12 inches. In some embodiments, the slab thickness 331 of the top slab 300 is 6 inches, 8 inches, 10 inches, 12 inches, 14 inches, 16 inches, 20 inches, 24 inches, 36 inches, or a value between the aforementioned values. In some embodiments, the slab thickness 331' of the bottom slab 300 is 10 inches. In some embodiments, the slab thickness 331 of the top slab 300 is 6 inches, 8 inches, 10 inches, 12 inches, 14 inches, 16 inches, 20 inches, 24 inches, 36 inches, or a value between the aforementioned values.

FIG. 6A shows an isometric view of an end column 400. FIG. 6B shows a top view of the end column 400 shown in FIG. 6A. FIG. 6C shows an end view of the end column 400 shown in FIG. 6A. FIG. 6D shows a side view of the end column 400 shown in FIG. 6A. FIG. 6E shows an end view of an end opposite the end of the end column 400 shown in FIG. 6C. FIG. 6F shows an end view of a top corbel 402 of the end column 400 as indicated by the section labeled "F" in FIG. 6C. FIG. 6G shows an end view of a bottom corbel 402 of the end column 400 as indicated by the section labeled "G" in FIG. 6C.

As shown in FIGS. 6A-6G, the end column 400 can include features corresponding to those described herein for the connecting column 200. Specifically, the illustrated end column 400 includes a pair of corbels 402, four anchor points 404, a seam 406, a horizontal surface 410, a vertical surface 412, a notch 414, a end-column port 420, and a canted surface 422 similar to corresponding features described herein with respect to the connecting column 200. FIG. 6D shows that the end-column port 420 can be a circular through hole that passes through the wall of the end column 400 near the bottom corbel 402. As shown in FIG. 6A, the end column 400 can include an inner ramped surface 423 that rises from the base of the end column 400 to meet the vertical wall of the end column 400 near the height where the end-column port 420 passes through the vertical wall of the end column 400. The ramped wall 423 forms an angle of approximately 135 degrees with the inner surface of the base of the end column 400, as shown in FIG. 6A. In some arrangements the ramped wall 423 forms an angle with the vertical wall of the end column 420 that can be with the range of 110 degrees and 160 degrees.

FIG. 7A shows an isometric view of an end column 400. FIG. 7B shows a top view of the end column 400 shown in FIG. 7A. FIG. 7C shows a side view of the end column 400 shown in FIG. 7A. FIG. 7D shows an end view of the end column 400 shown in FIG. 7A. FIG. 7E shows a side view of a side opposite the side of the end column 400 shown in FIG. 7C. FIG. 7F shows an end view of an end opposite the end of the end column 400 shown in FIG. 7D. FIG. 7G shows an end view of a top corbel 402 of the end column 400 as indicated by the section labeled "G" in FIG. 7D. FIG. 7H shows an end view of a bottom corbel 402 of the end column 400 as indicated by the section labeled "H" in FIG. 7D.

As shown in FIGS. 7A-7G, the end column 400 can include features corresponding to those described herein for the connecting column 200 and the end column 400 shown in FIGS. 6A-6G. Specifically, the illustrated end column 400 includes a pair of corbels 402, four anchor points 404, a seam 406, a horizontal surface 410, a vertical surface 412, a notch 414, a end-column port 420, and a canted surface 422 similar to corresponding features described herein with respect to the connecting column 200.

FIG. 7C shows that the end column 400 can include an inlet opening 416. The inlet opening 416 can be sized to allow a inlet pipe (not shown) to pass through the inlet opening 416 to access an interior space of the end column 400 that is framed by the base, the top, and the side walls of the end column 400. As discussed herein, water can enter the interior space of the end column 400 and be distributed along a duct-like structure formed by a plurality of end columns 400 arranged end to end with one another to form a manifold structure. In the illustrated embodiment, the inlet opening 416 is a circular through hole that has a smaller diameter than that of the end-column port 420. As shown in FIG. 7C, the inlet opening 416 and the end-column port 420 can be offset relative to one another. In the illustrated embodiment, the inlet opening 416 is disposed closer to the base of the end column 400 than is the end-column port 420. In some variants, the inlet opening 416 can be axially aligned with end-column port 420. In some embodiments, the inlet opening 416 can overlap partially with the connector port 420 when viewed from the side view that is shown in FIG. 7C. In the illustrated embodiment, the inlet opening 416 passes through a ramped inner wall that is near the base of the end column 400, giving the inlet opening 416 an open trough form, as shown in FIG. 7B.

FIGS. 8A-8H show similar views of an end column 400 as those views shown in FIGS. 7A-7H. As shown in FIG. 8C, the end column 400 can have an inlet opening 416 that axially aligns with the end-column port 420 when the inlet opening 416 is viewed along the longitudinal axis of the inlet opening 416. In the illustrated embodiment, a portion of the outer diameter of the inlet opening 416 aligns with a portion of the outer diameter of the end-column port 420 when viewed along the longitudinal axis of the inlet opening 416.

FIG. 9A shows an isometric view of an end column 400. FIG. 9B shows a top view of the end column 400 shown in FIG. 9A. FIG. 9C shows a side view of the end column 400 shown in FIG. 9A. FIG. 9D shows an end view of the end column 400 shown in FIG. 9A. FIG. 9E shows a side view of a side opposite the side of the end column 400 shown in FIG. 9C. FIG. 9F shows an end view of a top corbel 402 of the end column 400 as indicated by the section labeled "F" in FIG. 9D. FIG. 9G shows an end view of a bottom corbel 402 of the end column 400 as indicated by the section labeled "G" in FIG. 9D. As shown in FIGS. 9A-9G, the end column 400 can include features corresponding to those described herein for the connecting column 200 and the end column 400 shown in FIGS. 6A-6G. Specifically, the illustrated end column 400 includes an inlet opening 416 that is similar in size and shape as the end-column port 420. As shown in FIG. 9D, the inlet opening 416 can be arranged to axially align with the end-column port 420 when the inlet opening 416 is viewed along the longitudinal axis of the inlet opening 416 (see FIG. 9C).

FIGS. 10A-10G show similar views of an end column 400 as those views shown in FIGS. 9A-9G. As shown in FIG. 10C, the end column 400 can have an inlet opening 416 that is similar in size and shape with the end-column port 420, with the inlet opening 416 being disposed slightly further away from a bottom or base of the end column 400 than is the end-column port 420.

Figure 11G:
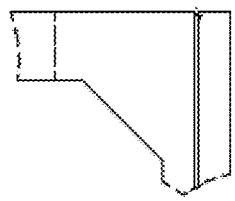
FIG. 11G illustrates an end view of the bottom corner of the end column of FIG. 11C.
Figure 11E:
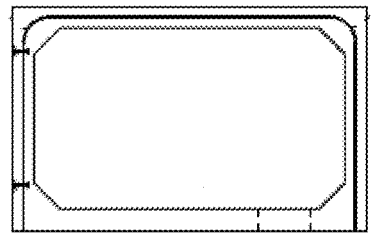
FIG. 11E illustrates an opposing end view of the end column of FIG. 11C.
Figure 11D:
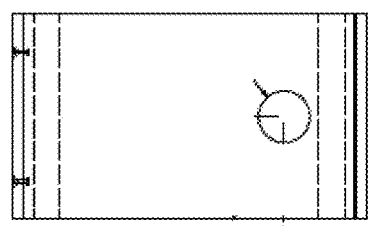
FIG. 11D illustrates a side view of an end column of FIG. 11A.
Figure 11B:
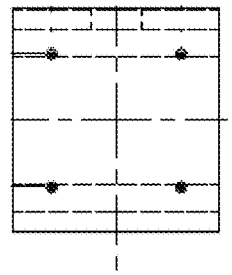
FIG. 11B illustrates a top view of the end column of FIG. 11A.
Figure 11C:
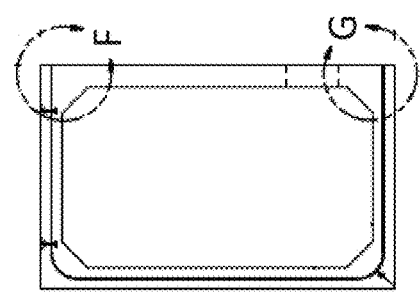
FIG. 11C illustrates an end view of an end column of FIG. 11A.
Figure 11A:
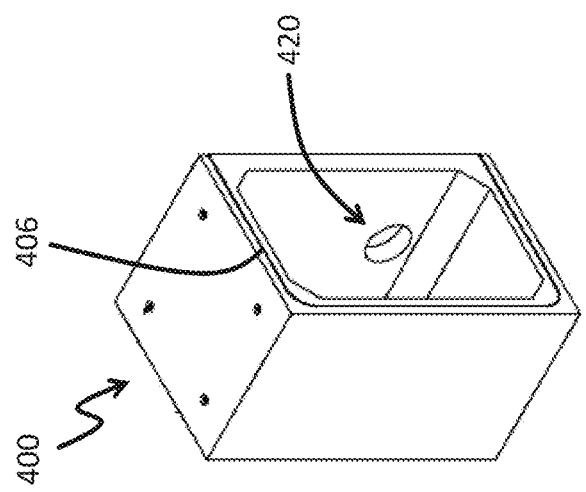
FIG. 11A illustrates a perspective view of an end column.
Figure 11F:
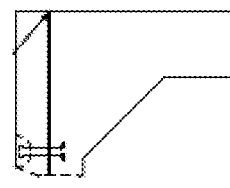
FIG. 11F illustrates an end view of a top corner of the end column of FIG. 11C.

FIGS. 11A-11G show similar views of an end column 400 as those views shown in FIGS. 6A-6G. As shown in FIG. 11A, the end column 400 is similar to the end column shown in FIG. 6A except that the end column 400 of FIG. 11A does not have any corbels 402.

Figure 12G:
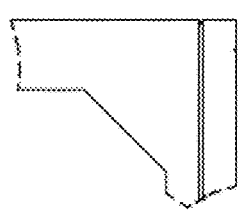
FIG. 12G illustrates an end view of the bottom corner of the access module of FIG. 12C.
Figure 12E:
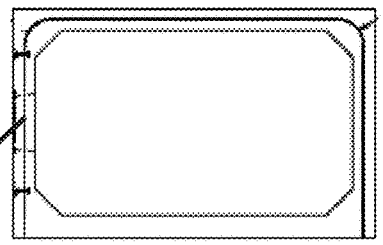
FIG. 12E illustrates an opposing end view of the access module of FIG. 12C.
Figure 12D:
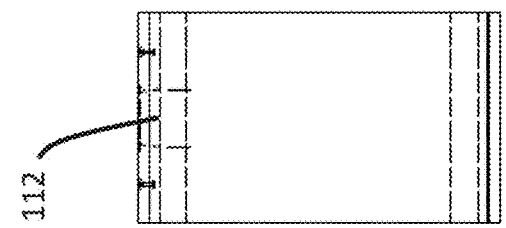
FIG. 12D illustrates a side view of the access module of FIG. 12A.
Figure 12B:
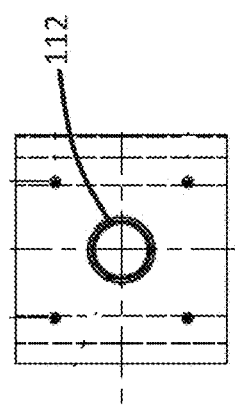
FIG. 12B illustrates a top view of the access module of FIG. 12A.
Figure 12C:
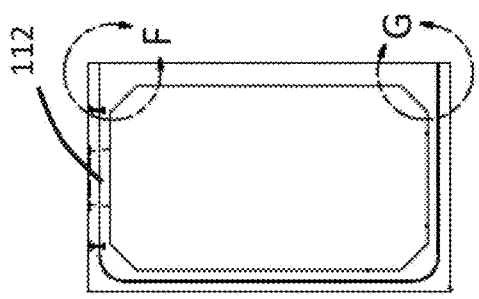
FIG. 12C illustrates an end view of the access module of FIG. 12A.
Figure 12A:
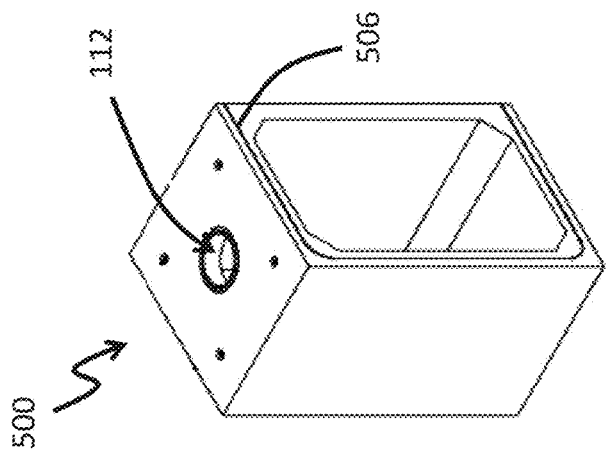
FIG. 12A illustrates a perspective view of an access module.
Figure 12F:
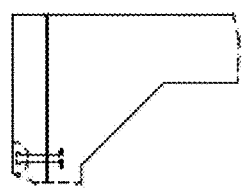
FIG. 12F illustrates an end view of a top corner of the access module of FIG. 12C.

FIG. 12A shows an isometric view of an access module 500. The access module 500 can include an access port 112 sized to allow a person to access the interior space of the storm water management system 100, as discussed herein. The access module 500 can include a seam 506 similar to the seam 206 described herein. FIG. 12B shows a top view of the access module 500 shown in FIG. 12A. FIG. 12C shows an end view of the access module 500 shown in FIG. 12A. FIG. 12D shows a side view of the access module 500 shown in FIG. 12A. FIG. 12E shows an end view of an end opposite the end of the access module 500 shown in FIG. 12C. FIG. 12F shows an end view of a portion of the access module 500 that is indicated by the section labeled "F" in FIG. 12C. FIG. 12G shows an end view of a portion of the access module 500 that is indicated by the section labeled "G" in FIG. 12C.

Figure 13G:
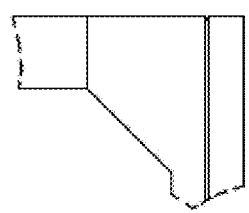
FIG. 13G illustrates an end view of the bottom corner of the left-notched module of FIG. 13C.
Figure 13E:
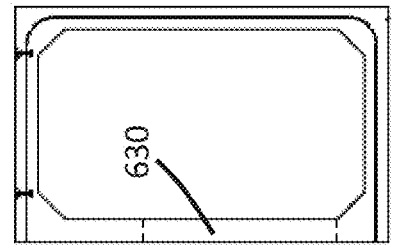
FIG. 13E illustrates an opposing end view of the left-notched module of FIG. 13C.
Figure 13D:
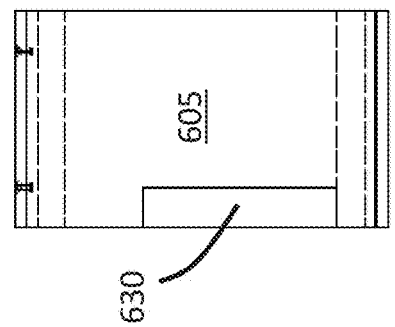
FIG. 13D illustrates a side view of the left-notched module of FIG. 13A.
Figure 13B:
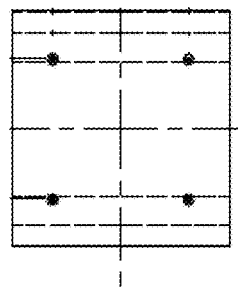
FIG. 13B illustrates a top view of the left-notched module of FIG. 13A.
Figure 13C:
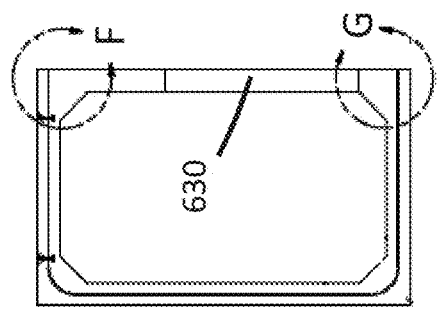
FIG. 13C illustrates an end view of the left-notched module of FIG. 13A.
Figure 13A:
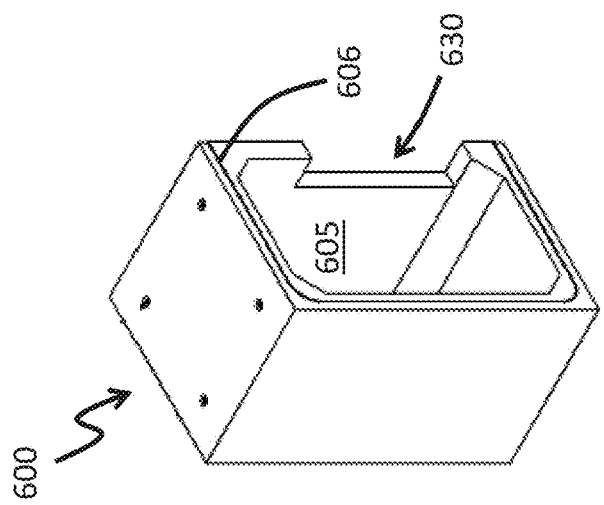
FIG. 13A illustrates a perspective view of a left-notched module.
Figure 13F:
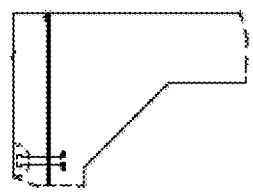
FIG. 13F illustrates an end view of a top corner of the left-notched module of FIG. 13C.

FIG. 13A shows an isometric view of a left-notched module 600. The left-notched module 600 can have a notch 630 that opens to a left-side edge of the module when the module is viewed from outside surface having the notch 630. The left-notched module 600 can include a seam 606 similar to the seam 206 described herein. FIG. 13B shows a top view of the left-notched module 600 shown in FIG. 13A. FIG. 13C shows an end view of the left-notched module 600 shown in FIG. 13A. FIG. 13D shows a side view of the left-notched module 600 shown in FIG. 13A. As shown in FIG. 13D, the notch 630 can occupy about 10% of the area of the side wall 605. In some embodiments, a ratio between the area of the notch 630 and the area of the side wall 605 is 1:50; 1:20; 1:10; 1:8; 1:5, and values therebetween. FIG. 13E shows an end view of an end opposite the end of the left-notched module 600 shown in FIG. 13C. FIG. 13F shows an end view of a portion of the left-notched module 600 that is indicated by the section labeled "F" in FIG. 13C. FIG. 13G shows an end view of a portion of the left-notched module 600 that is indicated by the section labeled "G" in FIG. 13C.

Figure 14G:
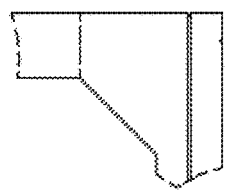
FIG. 14G illustrates an end view of the bottom corner of the right-notched module of FIG. 14C.
Figure 14E:
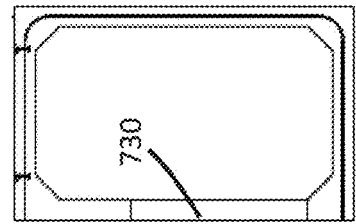
FIG. 14E illustrates an opposing end view of the right-notched module of FIG. 14C.
Figure 14D:
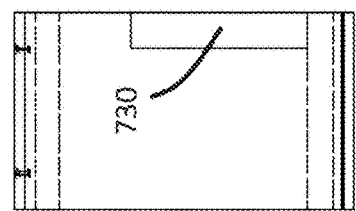
FIG. 14D illustrates a side view of the right-notched module of FIG. 14A.
Figure 14B:
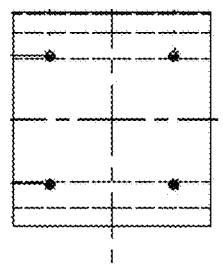
FIG. 14B illustrates a top view of the right-notched module of FIG. 14A.
Figure 14C:
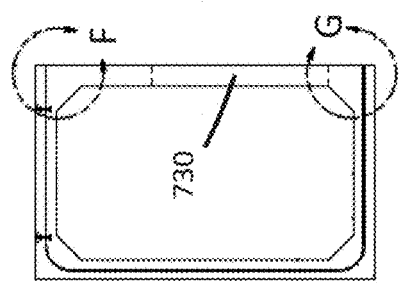
FIG. 14C illustrates an end view of the right-notched module of FIG. 14A.
Figure 14A:
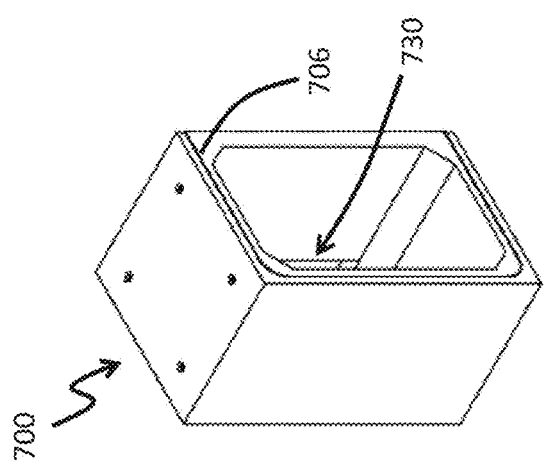
FIG. 14A illustrates a perspective view of a right-notched module.
Figure 14F:
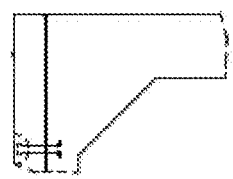
FIG. 14F illustrates an end view of a top corner of the right-notched module of FIG. 14C.

FIG. 14A shows an isometric view of a right-notched module 700. The right-notched module 700 is similar to the left-notched module 600 except as differently described herein. The right-notched module 700 can have a notch 730 that opens to a right-side edge of the module when the module is viewed from outside surface having the notch 730. The right-notched module 700 can include a seam 706 similar to the seam 206 described herein. FIG. 14B shows a top view of the right-notched module 700 shown in FIG. 14A. FIG. 14C shows an end view of the right-notched module 600 shown in FIG. 14A. FIG. 14D shows a side view of the right-notched module 700 shown in FIG. 14A. FIG. 14E shows an end view of an end opposite the end of the right-notched module 700 shown in FIG. 14C. FIG. 14F shows an end view of a portion of the right-notched module 700 that is indicated by the section labeled "F" in FIG. 14C. FIG. 14G shows an end view of a portion of the right-notched module 700 that is indicated by the section labeled "G" in FIG. 14C.

Figure 25:
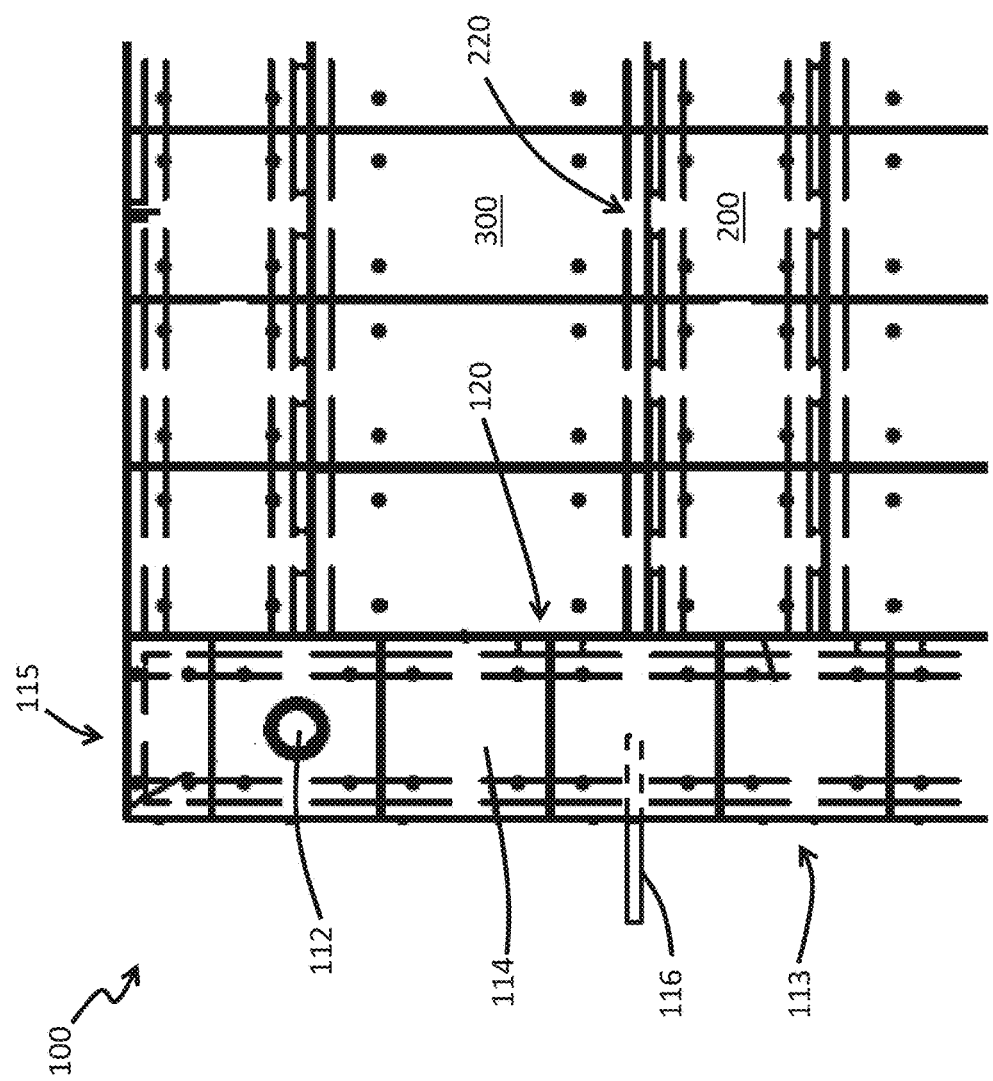
FIG. 25 illustrates a top view of a storm water management system.

The right-notched module 700 and the left-notch module can be sized so the corresponding notches 730, 630 of the notched modules 700, 600 align with one another to form a through hole when the notched modules 700, 600 are positioned end to end with one another. The notched modules 700, 600 can be used to form the manifold structure described with regard to FIG. 25. The through hole formed by joining the notched modules 700, 600 can provide or form a manifold port 120, as shown in FIG. 25 and described herein.

Figure 15G:
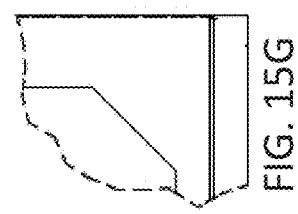
FIG. 15G illustrates an end view of the bottom corner of the dead-end module of FIG. 15C.
Figure 15E:
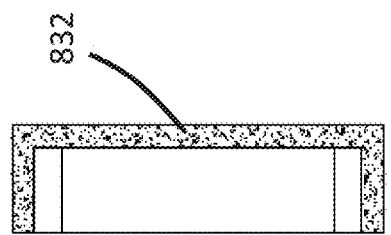
FIG. 15E illustrates an opposing end view of the dead-end module of FIG. 15C.
Figure 15D:
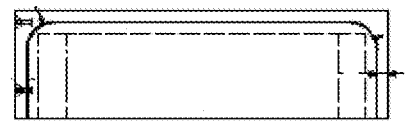
FIG. 15D illustrates a side view of the dead-end module of FIG. 15A.
Figure 15B:
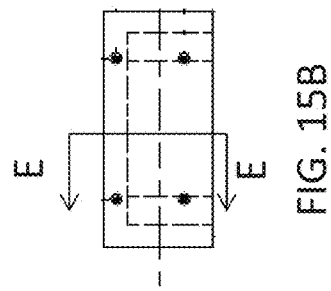
FIG. 15B illustrates a top view of the dead-end module of FIG. 15A.
Figure 15C:
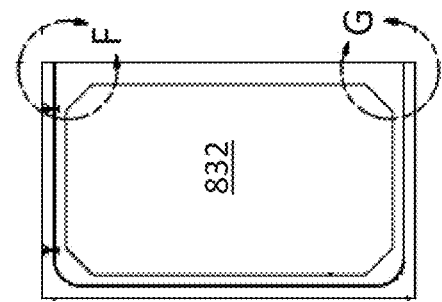
FIG. 15C illustrates an end view of the dead-end module of FIG. 15A.
Figure 15A:
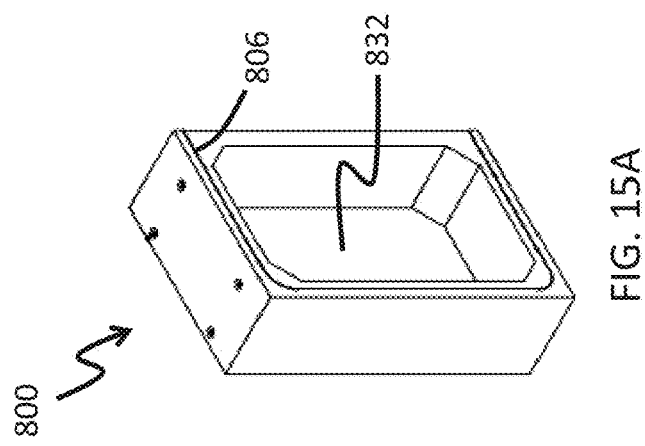
FIG. 15A illustrates a perspective view of a dead-end module.
Figure 15F:
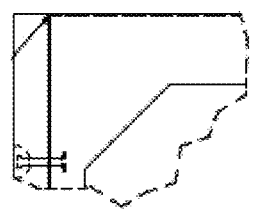
FIG. 15F illustrates an end view of a top corner of the dead-end module of FIG. 15C.

FIG. 15A shows an isometric view of a dead-end module 800. The dead-end module 800 can have a closed wall 832 that prevents flow through the closed wall 832. The dead-end module 800 can include a seam 806 similar to the seam 206 described herein. FIG. 15B shows a top view of the dead-end module 800 shown in FIG. 15A. FIG. 15C shows an end view of the dead-end module 800 shown in FIG. 15A. FIG. 15D shows a side view of the dead-end module 800 shown in FIG. 15A. FIG. 15E shows sectional view along the sectional line labeled "E" in FIG. 15B. FIG. 15F shows an end view of a portion of the dead-end module 800 that is indicated by the section labeled "F" in FIG. 15C. FIG. 15G shows an end view of a portion of the dead-end module 800 that is indicated by the section labeled "G" in FIG. 15C.

FIG. 16A shows an isometric view of an open-ended module 900. The open-ended module 900 can have a closed wall 932 that prevents flow through the closed wall 932. The open-ended module 900 can include an end opening 934 that provides a flow path through the closed wall 932. The open-ended module 900 can include a seam 906 similar to the seam 206 described herein. FIG. 16B shows a top view of the open-ended module 900 shown in FIG. 16A. FIG. 16C shows an end view of the open-ended module 900 shown in FIG. 16A. FIG. 16D shows a side view of the open-ended module 900 shown in FIG. 16A. FIG. 16E shows an end view of an end opposite the end of the open-ended module 900 shown in FIG. 16C. FIG. 16F shows sectional view along the sectional line labeled "F" in FIG. 16B. FIG. 16G shows an end view of a portion of the open-ended module 900 that is indicated by the section labeled "G" in FIG. 16C. FIG. 16H shows an end view of a portion of the open-ended module 900 that is indicated by the section labeled "H" in FIG. 16C.

Figure 17G:
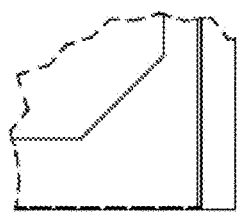
FIG. 17G illustrates an end view of the bottom corner of the wrapped-seam end module of FIG. 17C.
Figure 17E:
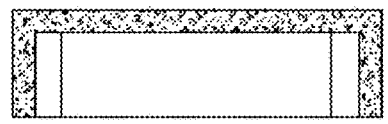
FIG. 17E illustrates a cross-sectional view of the wrapped-seam end module of FIG. 17B.
Figure 17D:
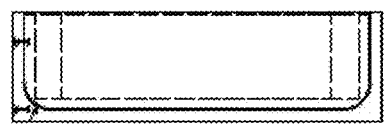
FIG. 17D illustrates a side view of the wrapped-seam end module of FIG. 17A.
Figure 17B:
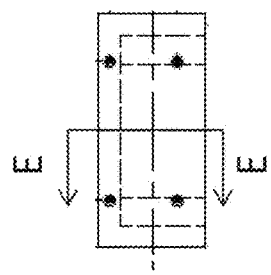
FIG. 17B illustrates a top view of the wrapped-seam end module of FIG. 17A.
Figure 17C:
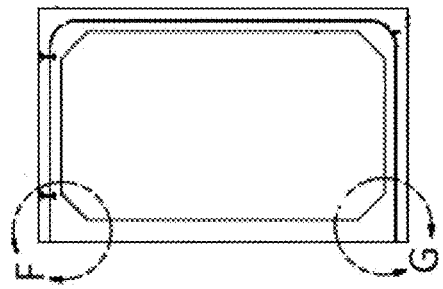
FIG. 17C illustrates an end view of the wrapped-seam end module of FIG. 17A.
Figure 17A:
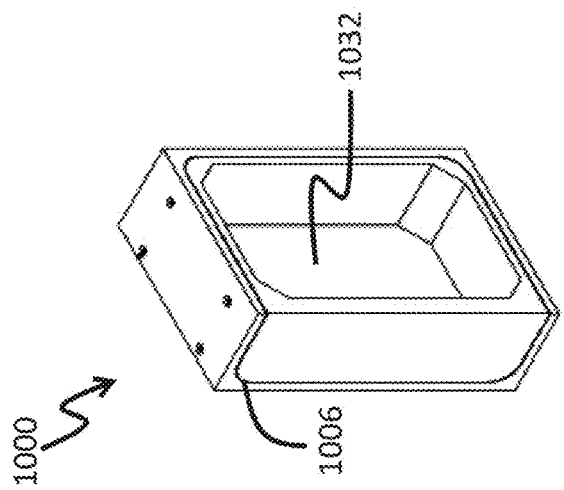
FIG. 17A illustrates a perspective view of a wrapped-seam end module.
Figure 17F:
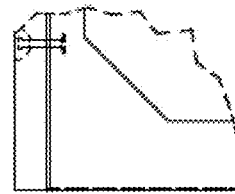
FIG. 17F illustrates an end view of a top corner of the wrapped-seam end module of FIG. 17C.

FIG. 17A shows an isometric view of a wrapped-seam end module 1000. The wrapped-seam end module 1000 can have a closed wall 1032 that prevents flow through the closed wall 1032. The wrapped-seam end module 1000 can include a seam 1006 similar to the seam 206 described herein. As shown in FIG. 17A, the seam 1006 can form a closed loop that extends across an end face and a side face of the wrapped-seam end module 1000. FIG. 17B shows a top view of the wrapped-seam end module 1000 shown in FIG. 17A. FIG. 17C shows an end view of the wrapped-seam end module 1000 shown in FIG. 17A. FIG. 17D shows a side view of the wrapped-seam end module 1000 shown in FIG. 17A. FIG. 17E shows a sectional view along the sectional line labeled "E" in FIG. 17B. FIG. 17G shows an end view of a portion of the wrapped-seam end module 1000 that is indicated by the section labeled "G" in FIG. 17C. FIG. 17H shows an end view of a portion of the wrapped-seam end module 1000 that is indicated by the section labeled "H" in FIG. 17C.

Figure 18G:
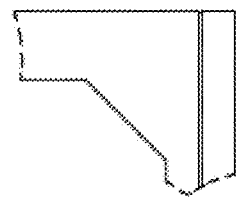
FIG. 18G illustrates an end view of the bottom corner of the spacer module of FIG. 18C.
Figure 18E:
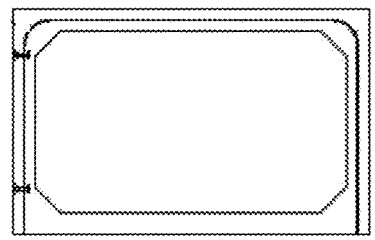
FIG. 18E illustrates an opposing end view of the spacer module of FIG. 18C.
Figure 18D:
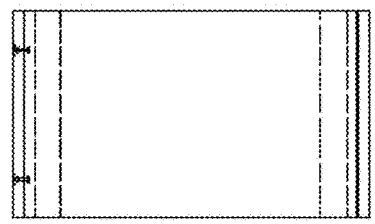
FIG. 18D illustrates a side view of the spacer module of FIG. 18A.
Figure 18B:
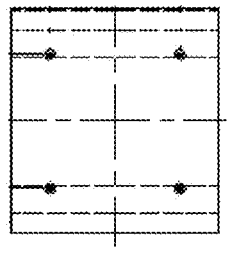
FIG. 18B illustrates a top view of the spacer module of FIG. 18A.
Figure 18C:
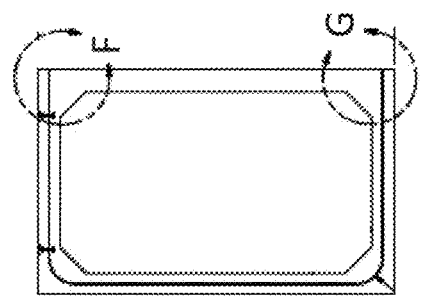
FIG. 18C illustrates an end view of the spacer module of FIG. 18A.
Figure 18A:
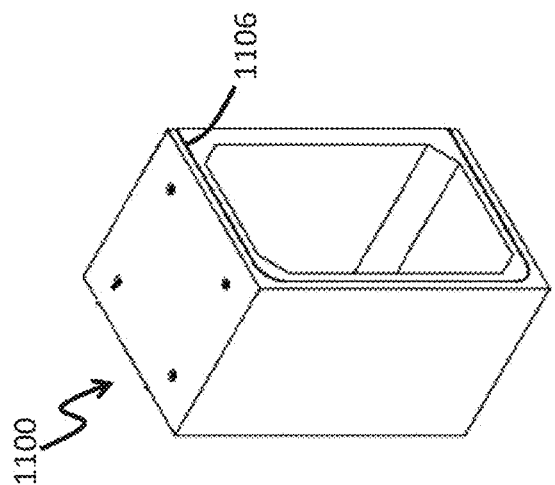
FIG. 18A illustrates a perspective view of a spacer module.
Figure 18F:
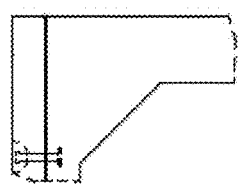
FIG. 18F illustrates an end view of a top corner of the spacer module of FIG. 18C.

FIG. 18A shows an isometric view of a spacer module 1100. The spacer module 1100 can include a seam 1106 similar to the seam 206 described herein. The spacer module 1100 can have a frame-like structure with open opposing end faces such that a plurality of space modules 1100 positioned end-to-end with one another can form a channel- or duct-like structure. The spacer modules 1100 can be sealed to form a channel adapted for conveyance of water from one location to another. FIG. 18B shows a top view of the spacer module 1100 shown in FIG. 18A. FIG. 18C shows an end view of the spacer module 1100 shown in FIG. 18A. FIG. 18D shows a side view of the spacer module 1100 shown in FIG. 18A. FIG. 18E shows an end view of an end opposite the end of the spacer module 1100 shown in FIG. 18C. FIG. 18F shows an end view of a portion of the spacer module 1100 that is indicated by the section labeled "G" in FIG. 18C. FIG. 18G shows an end view of a portion of the spacer module 1100 that is indicated by the section labeled "G" in FIG. 18C.

FIG. 19A shows an isometric view of a communicating spacer module 1200. The communicating spacer module 1200 can include a seam 1206 similar to the seam 206 described herein. The seam 1206 can form a continuous loop that extends over a side surface and two opposing end surfaces of the communicating spacer module 1200, as shown in FIG. 19A. The communicating spacer module 1200 can have a frame-like structure with open opposing end faces such that a plurality of communicating spacer module 1200 positioned end-to-end with one another can form a structure for use in conveyance as described herein with regard to the spacer module 1100 shown in FIG. 18A. The communicating spacer module 1200 can include a wall opening 1240 that provides a flow path between the exterior and the interior space of the communicating spacer module 1200. FIG. 19B shows a top view of the communicating spacer module 1200 shown in FIG. 19A. FIG. 19C shows an end view of the communicating spacer module 1200 shown in FIG. 19A. FIG. 19D shows a side view of the communicating spacer module 1200 shown in FIG. 19A. FIG. 19E shows an end view of an end opposite the end of the communicating spacer module 1200 shown in FIG. 19C. FIG. 19F shows an end view of a portion of the communicating spacer module 1200 that is indicated by the section labeled "G" in FIG. 19C. FIG. 19G shows an end view of a portion of the communicating spacer module 1200 that is indicated by the section labeled "G" in FIG. 19C. As shown in FIG. 19D, the wall opening 1240 can pass through a ramped interior wall near the base of the communicating spacer module 1200. FIG. 19 B shows that at least a portion of the wall opening 1240 can have an open trough-like structure by virtue of the wall opening 1240 passing through the ramped interior wall near the base of the communicating spacer module 1200.

Figure 20G:
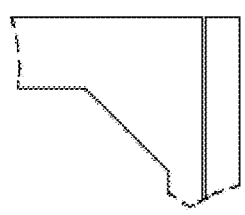
FIG. 20G illustrates an end view of the bottom corner of the spacer module of FIG. 20C.
Figure 20E:
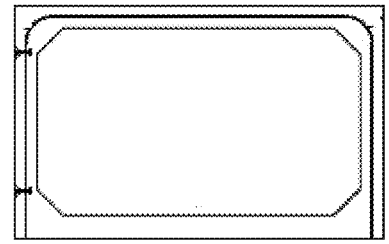
FIG. 20E illustrates an opposing end view of the spacer module of FIG. 20C.
Figure 20D:
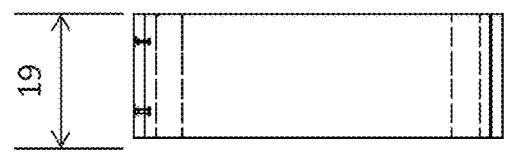
FIG. 20D illustrates a side view of the spacer module of FIG. 20A.
Figure 20B:
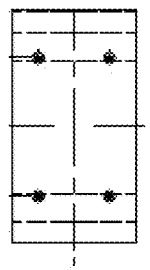
FIG. 20B illustrates a top view of the spacer module of FIG. 20A.
Figure 20C:
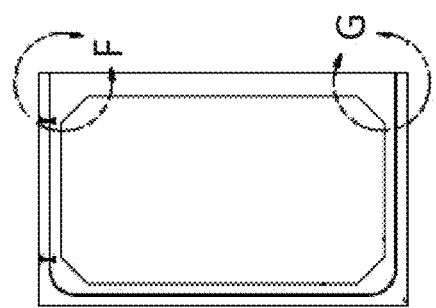
FIG. 20C illustrates an end view of the spacer module of FIG. 20A.
Figure 20A:
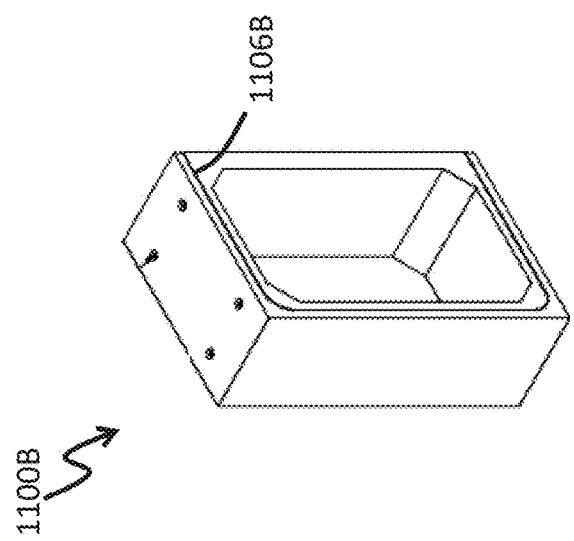
FIG. 20A illustrates a perspective view of a spacer module.
Figure 20F:
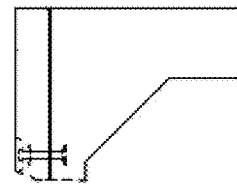
FIG. 20F illustrates an end view of a top corner of the spacer module of FIG. 20C.

FIGS. 20A-20E show views of a spacer module 1100B that are similar to the spacer module 1100 shown in FIGS. 18A-18E. As shown in FIG. 20A, the dimensions of the space module 1100, 1100B can be modified depending on the requirements of the storm water management system 100. For example, the spacer module 1100B shown in FIG. 20A has similar dimensions as the spacer module 1100 of FIG. 18A except that the spacer element 1100B shown in FIG. 20A has a shorter longitudinal length 19 (shown in FIG. 20D) than that of the spacer element 1100 shown in FIG. 18A. All the dimensions of the spacer module 1100B and the other modular components can similarly be varied depending on the requirements of the storm water management system 100.

Figure 21G:
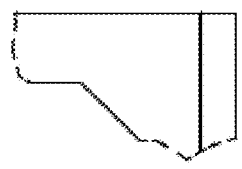
FIG. 21G illustrates an end view of the bottom corner of the multi-seamed spacer module of FIG. 21C.
Figure 21E:
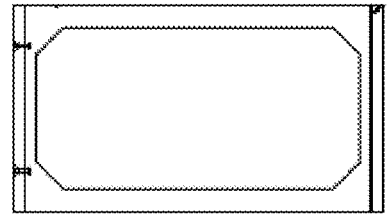
FIG. 21E illustrates an opposing end view of the multi-seamed spacer module of FIG. 21C.
Figure 21D:
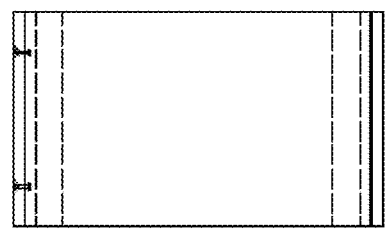
FIG. 21D illustrates a side view of the multi-seamed spacer module of FIG. 21A.
Figure 21B:
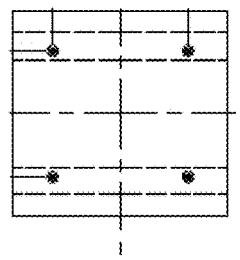
FIG. 21B illustrates a top view of the multi-seamed spacer module of FIG. 21A.
Figure 21C:
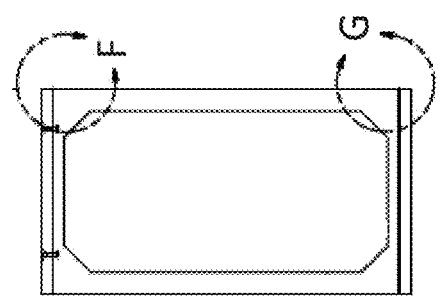
FIG. 21C illustrates an end view of the multi-seamed spacer module of FIG. 21A.
Figure 21A:
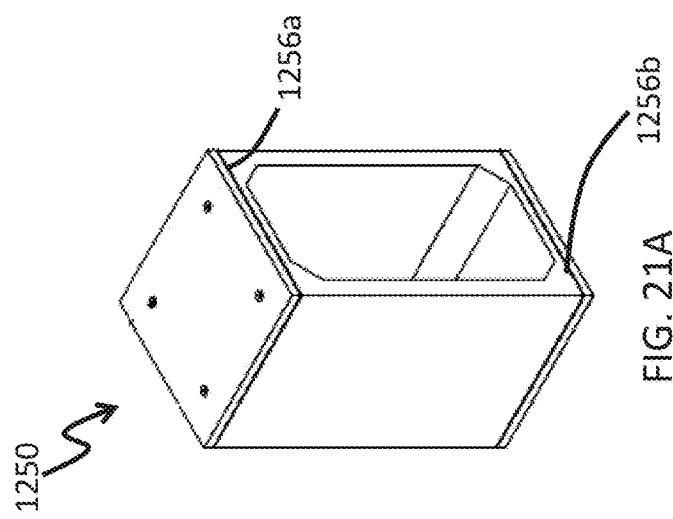
FIG. 21A illustrates a perspective view of a multi-seamed spacer module.
Figure 21F:
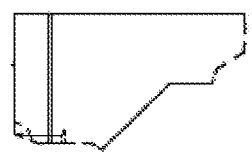
FIG. 21F illustrates an end view of a top corner of the multi-seamed spacer module of FIG. 21C.

FIG. 21A shows an isometric view of a multi-seamed spacer module 1250. The multi-seamed spacer module 1250 can have open opposing faces that form a duct-like structure when a plurality of multi-seamed spacer modules 1250 are aligned end-to-end with each other. The multi-seamed spacer module 1250 can have a top seam 1256a near the top of the multi-seamed spacer module 1250. The multi-seamed spacer module 1250 can have a bottom seam 1256b near the base of the multi-seamed spacer module 1250. FIG. 21B shows a top view of the multi-seamed spacer module 1250 shown in FIG. 21A. FIG. 21C shows an end view of the multi-seamed spacer module 1250 shown in FIG. 21A. FIG. 21D shows a side view of the multi-seamed spacer module 1250 shown in FIG. 21A. FIG. 21E shows an end view of an end opposite the end of the multi-seamed spacer module 1250 shown in FIG. 21C. FIG. 21F shows an end view of a portion of the multi-seamed spacer module 1250 that is indicated by the section labeled "F" in FIG. 21C. FIG. 21G shows an end view of a portion of the multi-seamed spacer module 1250 that is indicated by the section labeled "G" in FIG. 21C.

FIG. 22A shows an isometric view of a communicating wrapped-seam end module 1300, that is similar to the wrapped-seam end module 1000 of FIG. 17A except as described differently herein. FIG. 22B shows a rear isometric view of the communicating wrapped-seam end module 1300 shown in FIG. 22A. As shown in FIG. 22B, the communicating wrapped-seam end module 1300 can include a closed wall 1332 that prevents flow through the closed wall 1332. The communicating wrapped-seam end module 1300 can include an end opening 1334 that provides a flow path through the closed wall 1332. The communicating wrapped-seam end module 1300 can include a seam 1306 similar to the seam 206 described herein. FIG. 22C shows a top view of the communicating wrapped-seam end module 1300 shown in FIG. 22A. FIG. 22D shows an end view of the communicating wrapped-seam end module 1300 shown in FIG. 22A. FIG. 22E shows a side view of the communicating wrapped-seam end module 1300 shown in FIG. 22A. FIG. 22F shows an end view of an end opposite the end of the multi-seamed spacer module 1300 shown in FIG. 22D. FIG. 22G shows an end view of a portion of the wrapped-seam end module 1000 that is indicated by the section labeled "G" in FIG. 22D. FIG. 22H shows an end view of a portion of the wrapped-seam end module 1300 that is indicated by the section labeled "H" in FIG. 22D.

FIG. 23A shows an isometric view of a communicating multi-seamed spacer module 1400. The communicating multi-seamed spacer module 1400 can be similar to the multi-seamed spacer module 1200 of FIG. 21A except as described differently herein. The communicating multi-seamed spacer module 1400 can have open opposing faces that form a duct-like structure when a plurality of communicating multi-seamed spacer modules 1400 are aligned end-to-end with each other. The communicating multi-seamed spacer module 1400 can have a top seam 1406a near the top of the communicating multi-seamed spacer module 1400. The communicating multi-seamed spacer module 1400 can have a bottom seam 1206b near the base of the communicating multi-seamed spacer module 1400. FIG. 23B shows a top view of the communicating multi-seamed spacer module 1400 shown in FIG. 23A. FIG. 23C shows an end view of the communicating multi-seamed spacer module 1400 shown in FIG. 23A. FIG. 23D shows a side view of the communicating multi-seamed spacer module 1400 shown in FIG. 23A. FIG. 23E shows an end view of an end opposite the end of the communicating multi-seamed spacer module 1400 shown in FIG. 23C. FIG. 23F shows an end view of a portion of the communicating multi-seamed spacer module 1400 that is indicated by the section labeled "F" in FIG. 23C. FIG. 23G shows an end view of a portion of the communicating multi-seamed spacer module 1400 that is indicated by the section labeled "G" in FIG. 23C. The communicating multi-seamed spacer module 1400 can include a wall opening 1440 that provides a flow path between the exterior and the interior space of the communicating multi-seamed spacer module 1400 as discussed herein.

Figure 24:
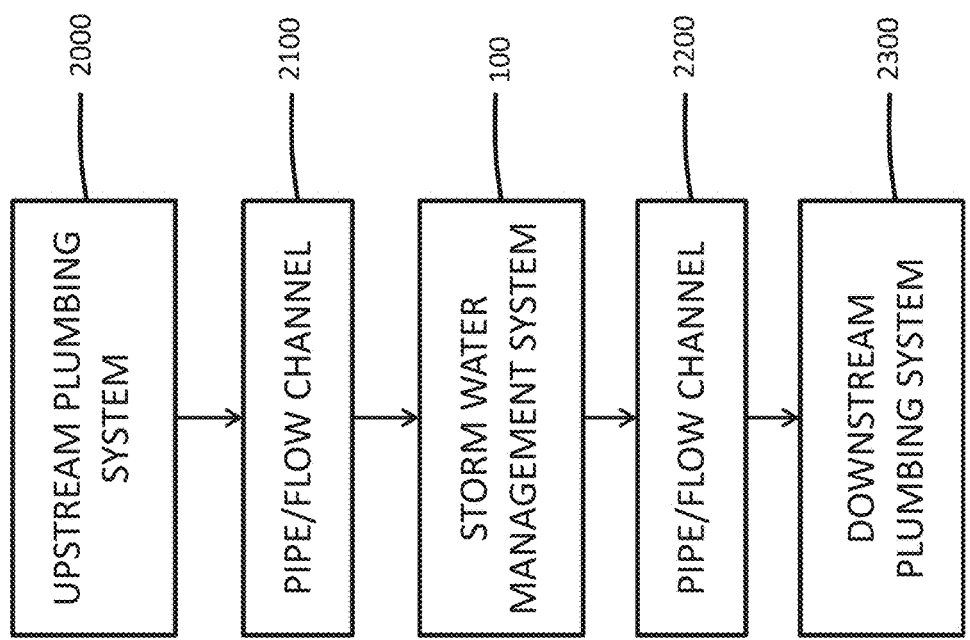
FIG. 24 illustrates a schematic diagram of a flow path through the storm water management system.

FIG. 24 illustrates a schematic diagram of a flow path of water through the storm water management system 100. Storm water can be collected by an upstream plumbing system 2000. The upstream plumbing system can deliver the storm water to an inflow pipe or flow channel 2100. The inflow pipe or flow channel 2100 can deliver the storm water to the storm water management system 100. Water can be removed from the storm water management system through an outflow pipe of flow channel 2200. The outflow pipe or flow channel 2200 can deliver the storm water to a downstream plumbing system 2300. In some embodiments one or more of the aforementioned features can be removed from the flow path depending on the use of the storm water management system 100. For example, a storm water management system 100 configured for infiltration may not pass the storm water through to a downstream plumbing system 2300.

FIG. 25 illustrates a top view of a portion of a storm water management system 100. The storm water management system 100 can include modules that can be assembled to create a manifold structure 114 or other portions of the storm water management system 100. The manifold structure 114 can receive water inflow through an inlet pipe 116. The modules that form the manifold structure 114 can be open on one side or include features that provide a flow path across a wall of the module such that modules form a duct of channel when assembled. In the illustrated embodiment of FIG. 25, the manifold structure 114 can form a duct that provides a flow path in the direction from the inlet pipe 116 toward the access port 112. In the illustrated embodiment, the manifold structure 114 is at an edge or periphery of the storm water management system 100, and the inlet pipe 116 enters a long side 113 of the manifold structure 114. In some arrangements, the manifold structure 114 can be disposed centrally from the periphery of the storm water management system 100. For example with reference to the orientation of the system 100 shown in FIG. 25, the manifold structure 114 can be disposed vertically with connecting columns 200 and slabs 300 disposed to the left side and to the right side of the manifold structure 114. In some arrangements, the inlet pipe 116 can enter the manifold structure 114 at a short end 115 of the manifold structure 114. In some variants, the inlet pipe 116 can be extended through the internal space of the system 100 to reach a long side 113 of a centrally-located manifold structure 114.

With continued reference to FIG. 25, the manifold structure 114 can include manifold ports 120 that provide a flow path between the manifold structure 114 and an adjacent portion of the storm water management system 100. The manifold structure 114 can help to distribute water from the inlet pipe 116 to the other portions of the storm water management system 100.

As described herein, the storm water management system 100 can be adapted to perform one or more of the functions of retention, detention, conveyance, and infiltration. For example, the floor 104 can be sealed for a storm water management system 100 configured for retention, detention, or conveyance. In some variants, the floor 104 can include a plurality of through holes or seepage paths that allow water within the storm water management system 100 to seep or flow into the underlying supporting surface over which the system 100 is installed. In the illustrated embodiment, the interface between adjacent connecting columns 200 aligns with the interface between adjacent slabs 300. In some embodiments, the interface between adjacent connecting columns 200 can be offset from the interface between adjacent slabs 300. When these interfaces are offset from one another, a connecting column 200 will partially span across two adjacent slabs.

Figure 26:
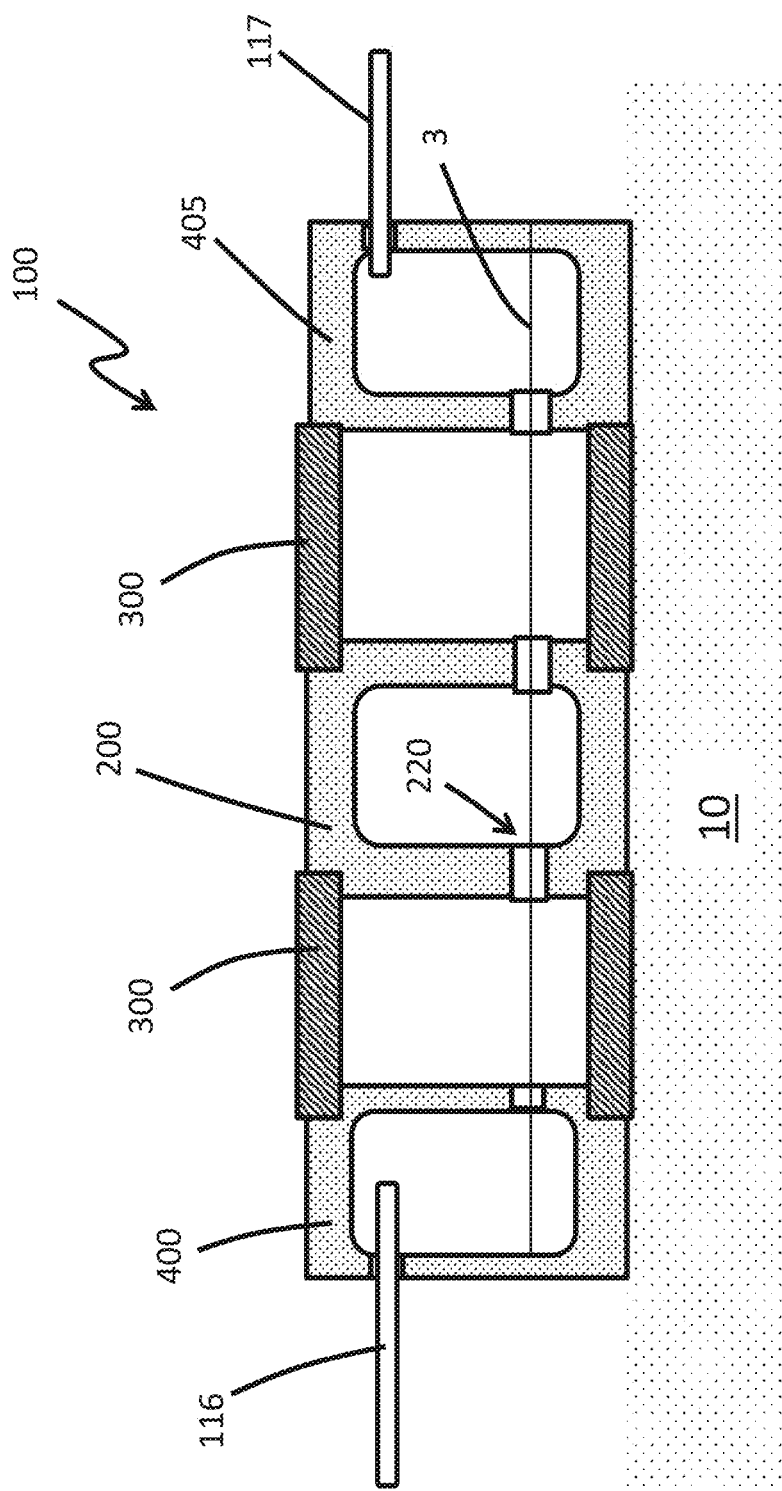
FIG. 26 illustrates a schematic diagram of a storm water management system configured for retention.

FIG. 26 illustrates a side cross-sectional view of a storm water management system 100 configured for retention. The water level of the storm water within the system 100 is shown as a horizontal line 3. The horizontal line 3 is shown at the level of the connecting column port 220. The water level within the storm water management system 100 can be higher or lower than the illustrated horizontal line 3. The storm water management system 100 can include an inlet pipe 116 that delivers storm water to the interior space of the storm water management system 100. The storm water management system 100 can include connecting columns 200, slabs 300, and end columns 400 as described herein. In some embodiments, the storm water management system 100 can have an outflow pipe 117. The outflow pipe 117 can be arranged as an overflow conduit that provides a flow path for water to exit the interior space of the storm water management system 100. The outflow pipe 117 can be positioned near the top wall 405 of an end column 400 and can serve as an overflow pipe, as shown in FIG. 26. In some variants, the maximum flow rate of the outflow pipe 117 can be similar to or greater than the maximum flow rate of the inlet pipe 116. In some embodiments, the storm water management system 100 that is configured for retention does not include an outflow pipe 117.

Figure 27:
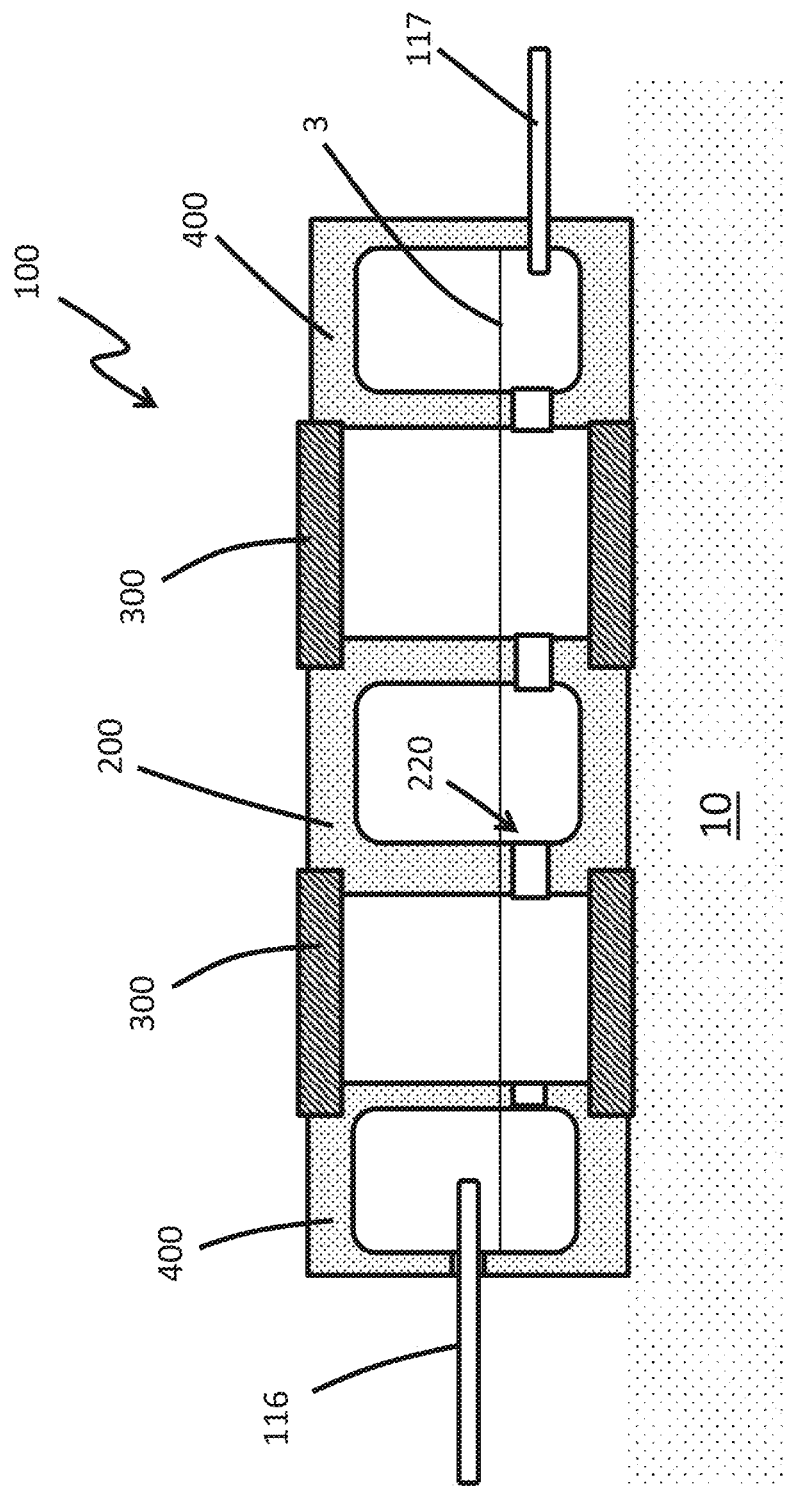
FIG. 27 illustrates a schematic diagram of a storm water management system configured for detention.

FIG. 27 illustrates a side cross-sectional view of a storm water management system 100 configured for detention. The storm water management system 100 can include an inlet pipe 116 that delivers storm water to the interior space of the storm water management system 100. The storm water management system 100 can include an outflow pipe 117 that provides a flow path for storm water to leave the interior space of the system 100. In some variants, the outflow pipe 117 can be arranged as a flow restriction, with the maximum flow rate of the outflow pipe 117 being less than the maximum flow rate of the inlet pipe 116. The storm water management system 100 can be sealed to prevent the accumulated storm water from entering (infiltrating) the underlying surface 10. The storm water management system 100 can detain the water within the interior space of the system 100 and slowly release the water from the interior space through the outflow pipe 117. The maximum flow rate of storm water through the outflow pipe 117 can be less than the maximum flow rate of storm water through the inlet pipe 116, allowing a rapid flood of storm water to be detained within the system 100 and released from the system 100 slowly through the outflow pipe 117. The outlet pipe 117 can be positioned closer to the floor 104 of the system 100 than is the inlet pipe 116, as shown in FIG. 27.

Figure 28:
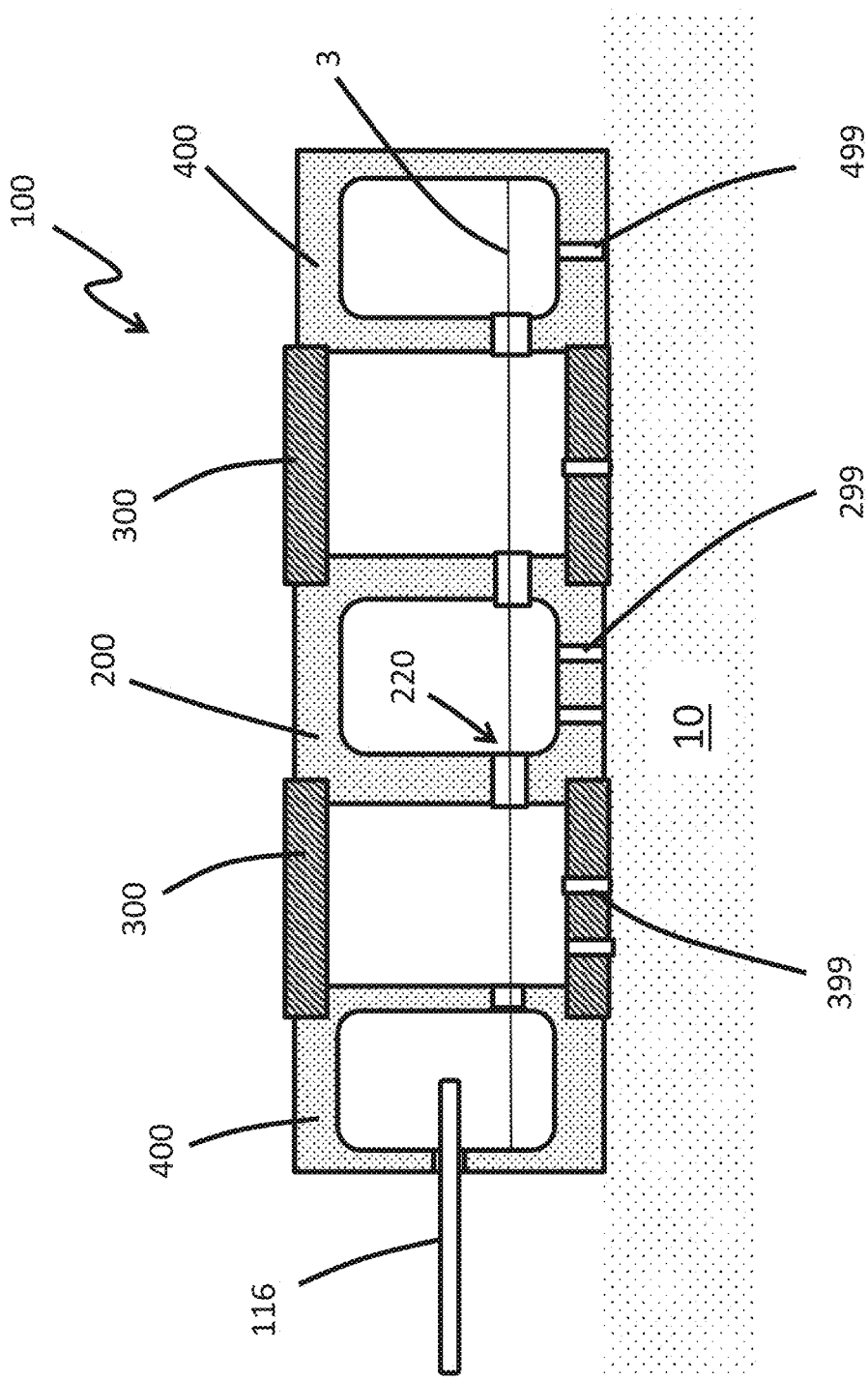
FIG. 28 illustrates a schematic diagram of a storm water management system configured for infiltration.

FIG. 28 illustrates a side cross-sectional view of a storm water management system 100 configured for infiltration. The storm water management system 100 can include an inlet pipe 116 that delivers storm water to the interior space of the storm water management system 100. The storm water management system 100 can include a plurality of flow passages 299, 399, 499 that allow the accumulated storm water to infiltrate the underlying surface 10. In some arrangements, the slabs 300 that are positioned on the underlying surface 10 are not flush with one another such that there is a gap between adjacent slabs 300. The gap provides a flow path for water within the system 100 to infiltrate the underlying surface 10.

Figure 29:
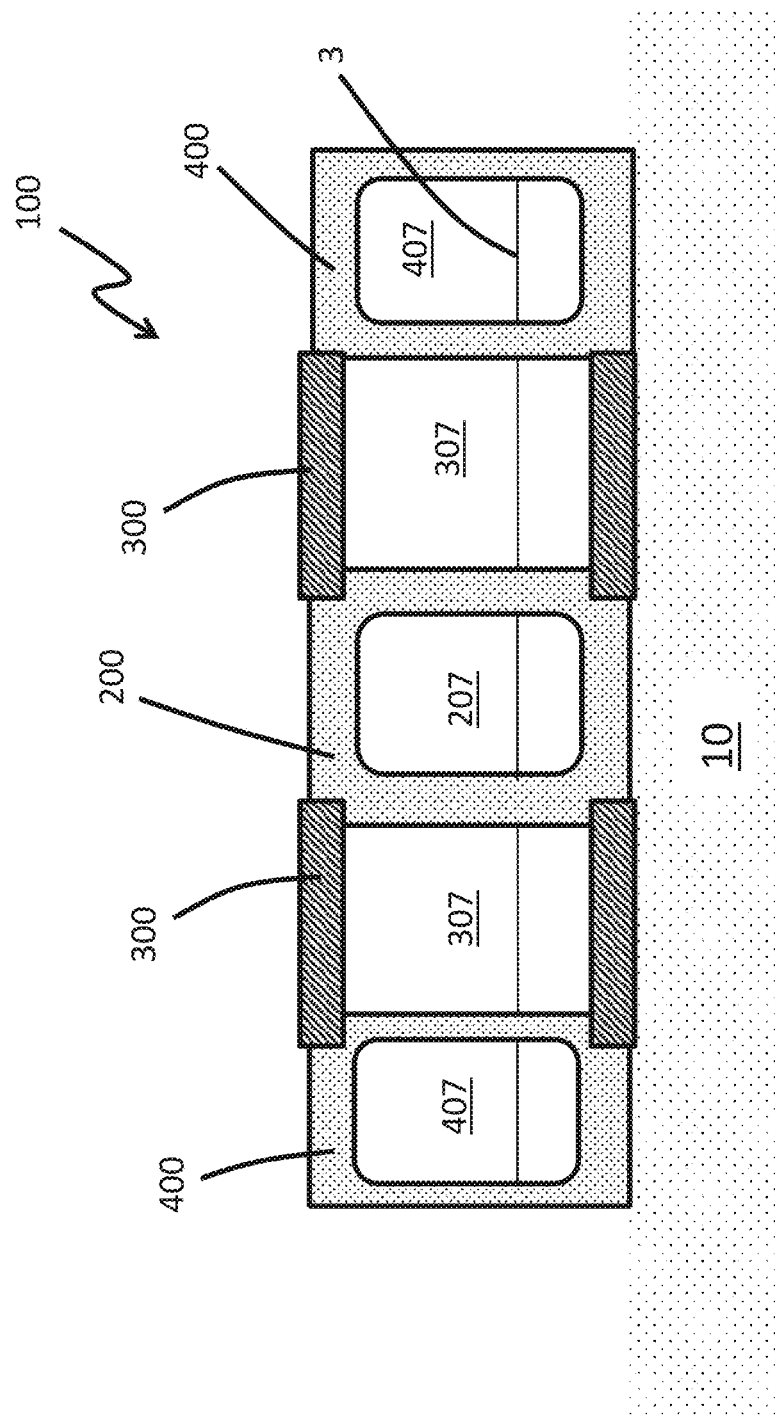
FIG. 29 illustrates a schematic diagram of a storm water management system configured for conveyance.

FIG. 29 illustrates a side cross-sectional view of a storm water management system 100 configured for conveyance. The storm water management system 100 can include a plurality of connecting columns 200 positioned end-to-end to form a duct for conveying water. The duct structure can be sealed to prevent the conveyed water from escaping the duct. In the illustrated embodiment, the water level 3 is shown in the interior space 207 of the connecting column 200, the interior space 407 of the end columns 400 and the interior space 307 between the slabs 300. In some arrangements, the water can be conveyed by one or more than one of these interior spaces 207, 307, 407. For example, in some embodiments, the water is conveyed in the interior space of the connecting column 200 and end column 400 but not within the interior space 307 between the slabs 300. In some embodiments, the interior spaces 207, 307, 407 are fluidically isolated from one another such that there are no connector ports or flow paths connecting the interior spaces 207, 307, 407 to one another.

Figure 30:
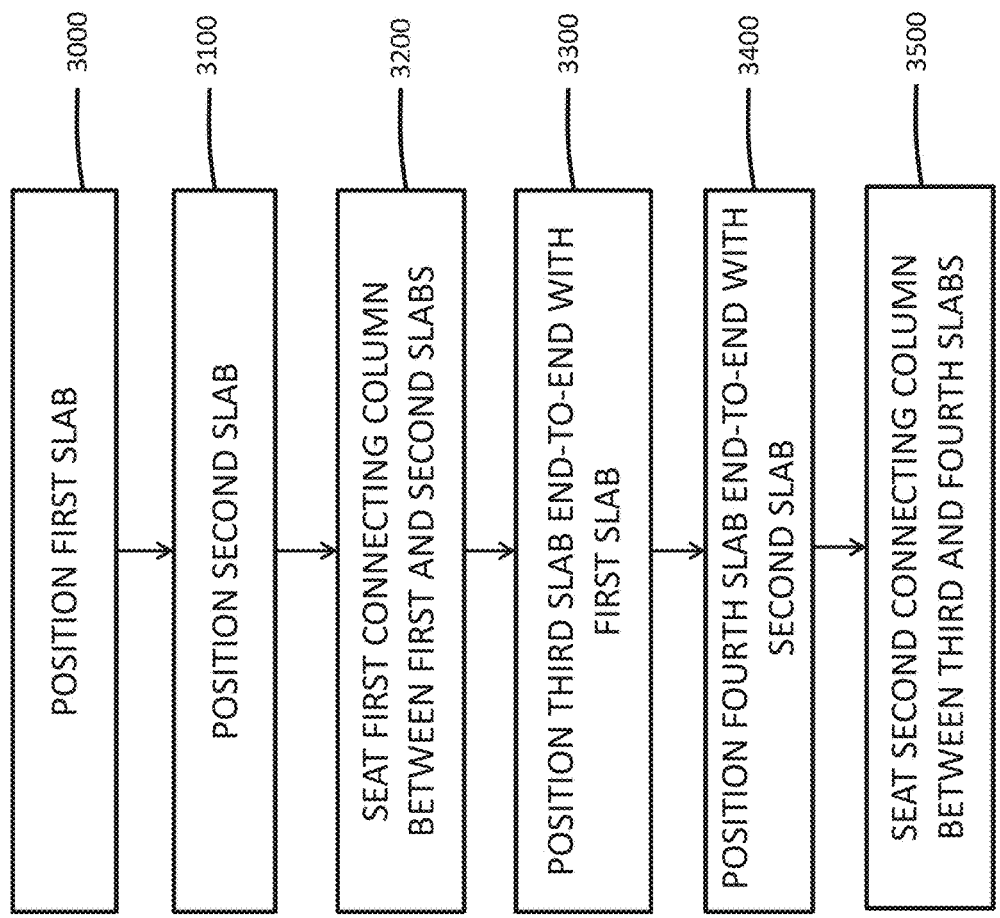
FIG. 30 illustrates a flow chart of a method of assembling a storm water management system.

FIG. 30 shows a schematic diagram of a method of assembling the storm water management system 100. The method includes a first step 3000 of positioning a first slab 300 on the underlying surface 10. The method further includes a second step 3100 of positioning a second slab on the underlying surface 10 such that the second slab 300 is spaced apart from the first slab 300, thereby forming a first opening between the first and second slabs 300. The method further includes the step 3200 of seating a first connecting column in the first opening. The method further includes the step 3300 of positioning a third slab 300 end-to-end with the first slab 300. The method further includes the step 3400 of positioning a fourth slab 300 end-to-end with the second slab 300 such that the fourth slab 300 is spaced apart from the third slab 300, thereby forming a second opening between the third and fourth slabs 300. The method further includes the step 3500 of seating a second connecting column 200 in the second opening. The method can further include repeating the alternation of the steps of end-to-end positioning of slabs 300 and seating of connecting columns 200 into the openings formed between the most-recently positioned slabs 300 such that the system 100 is extended along a direction of the end-to-end alignment of the slabs 300.

Other Variations and Terminology

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value. Moreover, although blocks of the various processes may be described in terms of determining whether a value meets or does not meet a particular threshold, the blocks can be similarly understood, for example, in terms of a value (i) being below or above a threshold or (ii) satisfying or not satisfying a threshold.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated or disclosed may differ from those shown in the figures. Depending on the embodiment, certain of the steps described above may be removed, others may be added. For example, the actual steps or order of steps taken in the disclosed processes may differ from those shown in the figure. Depending on the embodiment, certain of the steps described above may be removed, others may be added. For instance, the various components illustrated in the figures may be implemented as software or firmware on a processor, controller, ASIC, FPGA, or dedicated hardware. Hardware components, such as controllers, processors, ASICs, FPGAs, and the like, can include logic circuitry. Furthermore, the features and attributes of the specific embodiments disclosed above may be combined in different ways to form additional embodiments, all of which fall within the scope of the present disclosure.

Although the present disclosure includes certain embodiments, examples and applications, it will be understood by those skilled in the art that the present disclosure extends beyond the specifically disclosed embodiments to other alternative embodiments or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive

What is claimed is:

1. A method of assembling a storm water management system, the method comprising:
    positioning a first plurality of slabs end-to-end to form a first ribbon of slabs;
    positioning a second plurality of slabs end-to-end to form a second ribbon of slabs, wherein the first and second ribbons are aligned with one another and spaced apart to form a first opening between the first and second ribbons; and
    seating a first connecting column in the first opening such that a first bottom corbel extending from an outside surface of a first side wall of the first connecting column overlaps a first edge portion of the first ribbon and a second bottom corbel extending from an outside surface of a second side wall of the first connecting column overlaps a first edge portion of the second ribbon.

2. The method of claim 1, wherein the method further comprises positioning a third plurality of slabs end-to-end to form a third ribbon of slabs, wherein the second and third ribbons are aligned with one another and spaced apart to form a second opening between the second and third ribbons, the second ribbon being disposed between the first and third ribbons.

3. The method of claim 2, wherein the method further comprises seating a second connecting column in the second opening such that a third bottom corbel extending from an outside surface of a first side wall of the second connecting column overlaps a second edge portion of the second ribbon and a fourth bottom corbel extending from an outside surface of a second side wall of the second connecting column overlaps a first edge portion of the third ribbon.

4. The method of claim 3, wherein the method further comprises positioning a first top slab such that the first top slab spans between a first top corbel and a second top corbel, the first top corbel extending from the outside surface of the second side wall of the first connecting column, the second top corbel extending from the outside surface of the first side wall of the second connecting column.

5. The method of claim 4, wherein the method further comprises positioning an end column such that a fifth bottom corbel extending from an outside surface of a first side wall of the end column overlaps a second edge portion of the first ribbon.

6. The method of claim 5, wherein the method further comprises positioning a second top slab such that the second top slab spans between a third top corbel and a fourth top corbel, the third top corbel extending from the outside surface of the first side wall of the first connecting column, the fourth top corbel extending from the outside surface of the first side wall of the end column.

7. The method of claim 5, wherein positioning the end column further comprises positioning the end column such that a connector port disposed in the first side wall of the end column provides a flow path between an interior space of the end column and a space overlying the first slab.

8. The method of claim 1, wherein the method further comprises positioning a first plurality of subsequent connecting columns such that an interior space of each of the first plurality of subsequent connecting columns is axially aligned with an interior space of the first connecting column, thereby forming with the first connecting column and the first plurality of subsequent connecting columns a duct structure that extends along the first opening.

9. The method of claim 1, wherein seating the first connecting column in the first opening further comprises positioning the first connecting column such that a connector port disposed in the first side wall of the first connecting column provides a flow path between an interior space of the first connecting column and a space overlying the first slab.

10. The method of claim 1, wherein positioning the first plurality of slabs end-to-end further comprises providing a flow path between an interior surface and an exterior surface of at least one of the first plurality of slabs, wherein the interior surface faces away from the exterior surface and the exterior surface faces toward an underlying surface that supports the first plurality of slabs.

11. A storm water management system comprising:
    a plurality of connecting columns, each of the plurality of connecting columns comprising:
        a base wall, a top wall, and a pair of opposing side walls that are spaced apart from one another and extend from the base wall to the top wall such that an interior space of the connecting column is surrounded by the base wall, the top wall, and the pair of opposing side walls;
        a first corbel extending from an outside surface of a first one of the pair of opposing side walls, the first corbel extending in a direction that is away from the interior space of the connecting column, the first corbel comprising a shelf surface and an abutment surface, wherein in use the shelf surface of the first corbel faces toward an underlying surface that supports the storm water management system;
        a second corbel extending from the outside surface of the first one of the pair of opposing side walls, the second corbel comprising a shelf surface and an abutment surface, the shelf surface of the second corbel facing away from the shelf surface of the first corbel;
        a third corbel extending from an outside surface of a second one of the pair of opposing side walls, the third corbel extending in a direction that is away from the interior space of the connecting column, the third corbel comprising a shelf surface and an abutment surface, wherein in use the shelf surface of the third corbel faces toward an underlying surface that supports the storm water management system;

a fourth corbel extending from the outside surface of the second one of the pair of opposing side walls, the fourth corbel comprising a shelf surface and an abutment surface, the shelf surface of the fourth corbel facing away from the shelf surface of the third corbel; and a plurality of slabs, each of the plurality of slabs having a generally planar shape and a slab thickness corresponding to a height of an end surface of the slab, wherein in use the abutment surface of at least one of the first corbels is adjacent to and extends along at least a portion of the end surface of at least one of the plurality of slabs.

12. The storm water management system of claim 11, wherein at least one of the plurality of connecting columns comprises a connecting column port that provides a flow path across one of the pair of opposing side walls.

13. The storm water management system of claim 12, wherein the connector column port has a cross-sectional area that is between 1% and 10% of a cross-sectional area of the side wall through which the connector column port is disposed.

14. The storm water management system of claim 12, wherein the connector column port is disposed closer to the base wall than to the top wall.

15. The storm water management system of claim 11, wherein each of the plurality of connecting columns has an interior space that is similarly shaped as the interior space of all the other connecting columns of the plurality.

16. The storm water management system of claim 11, wherein at least some of the plurality of connecting columns are positioned end-to-end with respect to one another such that the at least some of the plurality of connecting columns forms a duct like structure.

17. The storm water management system of claim 11, further comprising a seal disposed at a junction between an end surface of one of the plurality of slabs and an abutment surface of one of the plurality of connecting columns, wherein the seal impedes water flow through said junction.

18. The storm water management system of claim 11, wherein at least one of the first, second, third, and fourth corbels comprises a canted surface that forms a corbel angle with the outside surface from which the corbel extends.

19. The storm water management system of claim 18, wherein at least one of the first, second, third, and fourth corbels comprises a filler surface that extends from the canted surface to the shelf surface of the at least one of the first, second, third, and fourth corbels.

20. The storm water management system of claim 18, wherein the corbel angle is between 110 degrees and 160 degrees.

21. A method of assembling a storm water management system, the method comprising:

positioning a first slab;

positioning a second slab such that the second slab is spaced apart from the first slab, thereby creating a first opening between the first slab and the second slab; and seating a first connecting column in the first opening such that a first bottom corbel extending from an outside surface of a first side wall of the first connecting column overlaps a first edge portion of the first slab and a second bottom corbel extending from an outside surface of a second side wall of the first connecting column overlaps a first edge portion of the second slab.

22. The method of claim 21, wherein the method further comprises:

positioning a third slab end-to-end with the first slab; and positioning a fourth slab end-to-end with the second slab, such that a second opening is formed between the third slab and the fourth slab.

23. The method of claim 22, wherein the method further comprises seating a second connecting column in the second opening such that a third bottom corbel extending from an outside surface of a first side wall of the second connecting column overlaps a first edge portion of the third slab and a second bottom corbel extending from an outside surface of a second side wall of the second connecting column overlaps a first edge portion of the fourth slab.

* * * * *